United States Patent [19]
> Kolell

[11] 3,842,330
[45] Oct. 15, 1974

[54] METHOD AND APPARATUS FOR NUMERICAL CONTROL OF MEMBERS INDEPENDENTLY MOVABLE ALONG COINCIDENT AXES

[76] Inventor: Norbert C. Kolell, c/o Giddings & Lewis, Inc., Fond Du Lac, Wis. 54935

[22] Filed: Aug. 9, 1972

[21] Appl. No.: 279,232

[52] U.S. Cl............. 318/574, 318/568, 235/151.11, 90/13
[51] Int. Cl. .......................................... G05b 19/22
[58] Field of Search ........... 318/567, 568, 569, 570, 318/571, 572, 573, 574; 235/151.11; 90/13

[56] References Cited
UNITED STATES PATENTS

| | | | |
|---|---|---|---|
| 3,497,780 | 2/1970 | Leenhouts | 318/574 |
| 3,633,011 | 1/1972 | Bederman | 318/574 X |
| 3,656,124 | 4/1972 | McGee | 318/573 X |
| 3,701,888 | 10/1972 | McDaniel | 318/574 X |
| 3,715,644 | 2/1973 | Bobrowicz | 318/573 |

*Primary Examiner*—T. E. Lynch
*Attorney, Agent, or Firm*—Wolfe, Hubbard, Leydig, Voit & Osann, Ltd.

[57] ABSTRACT

Methods and apparatus relating to either point-to-point or contouring control of the movable members of a machine tool, wherein two or more of such members are movable along a common axis relative to a base. In order to accept end-point commands numerically expressed in part coordinates along the common axis with reference to an origin in fixed relation to a workpiece or part mounted on the first such member, even though the servo controls or actual positioning operations can only act to bring the two members to positions measured in base coordinates with reference to a second origin fixed in relation to the base, a first signaled number representing the desired position of the second member in base coordinates is subtracted from a second signaled number representing the desired position, in part coordinates, for the first member. Such subtraction creates a changeable signaled third number representing the base coordinate positions to which the first member is to be moved under servo control. When the second member is moved, its displacement from one position to the next is added to the aforesaid first and second numbers, so that the third number does not change but the first number does change to provide a numerical representation of the base coordinate position to which the second member will be moved under its servo control.

11 Claims, 6 Drawing Figures

PATENTED OCT 15 1974    3,842,330

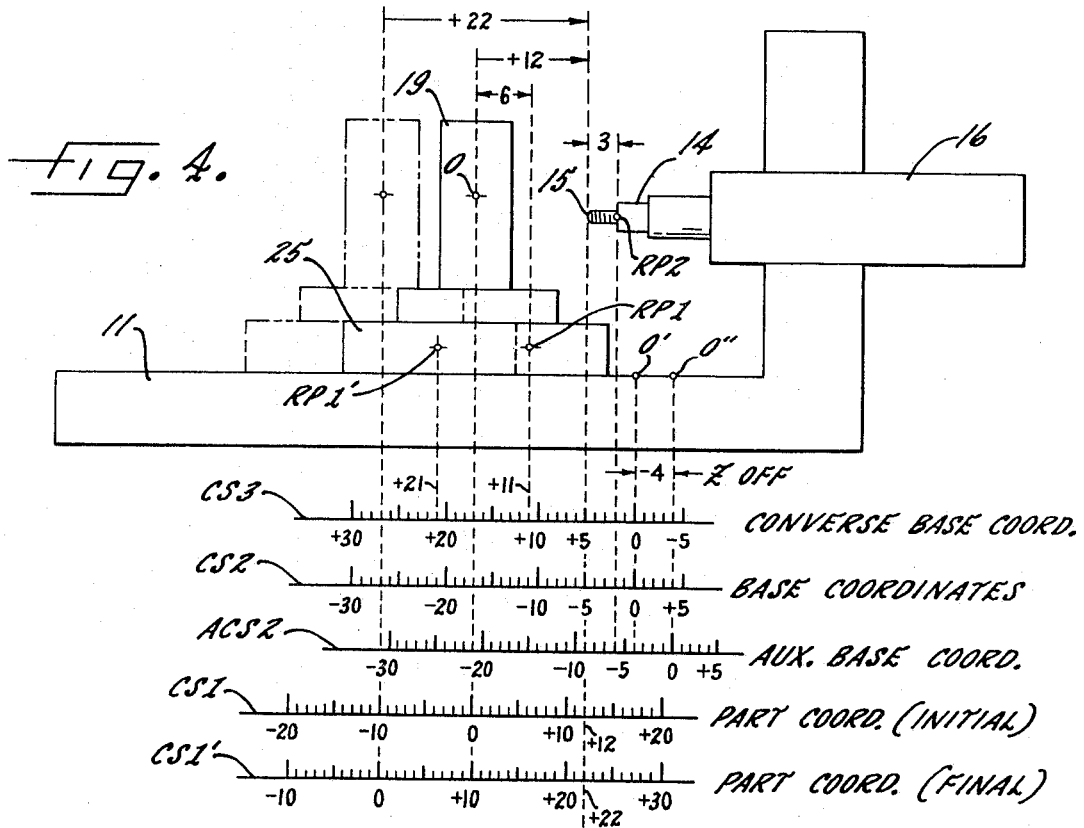
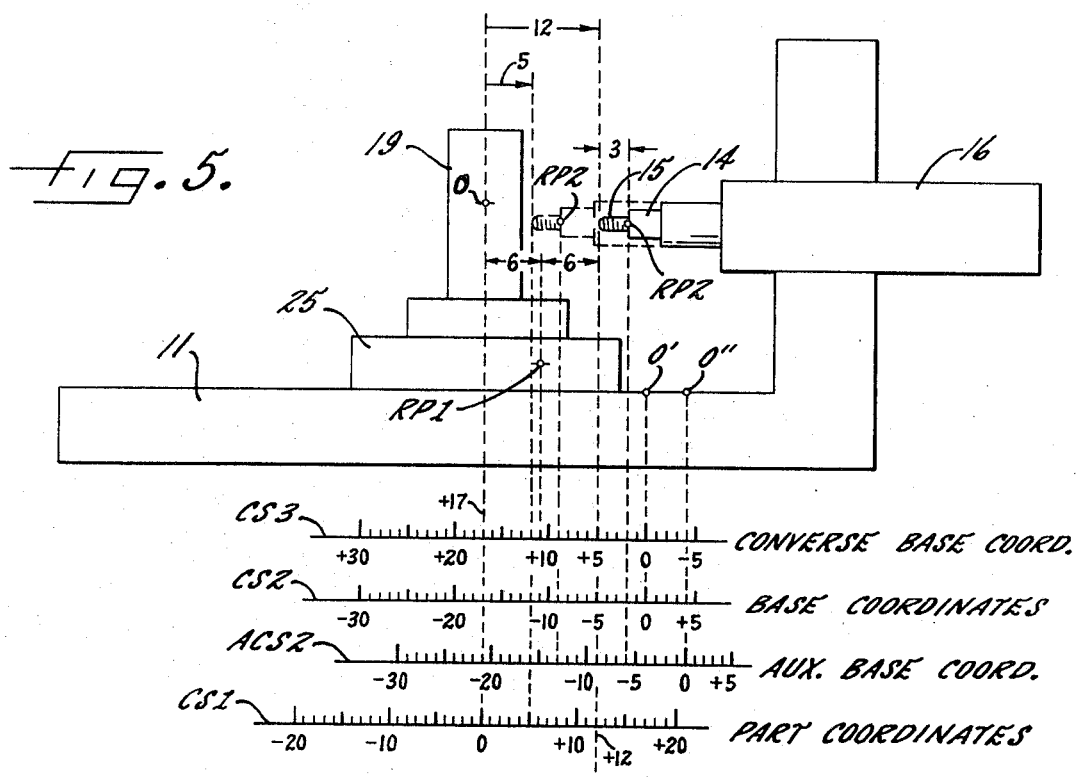

000
METHOD AND APPARATUS FOR NUMERICAL CONTROL OF MEMBERS INDEPENDENTLY MOVABLE ALONG COINCIDENT AXES

CROSS REFERENCE TO RELATED APPLICATIONS

Although no assertion is made that the subject application is entitled to benefits of a filing date earlier than its actual filing date, cross reference is here made to U.S. Pat. No. 3,656,124, issued Apr. 11, 1972 in the name of John K. McGee and assigned to the assignee of the subject application; and cross reference is also made to copending U.S. application Ser. No. 124,356, (now U.S. Pat. 3,727,191) filed Mar. 15, 1971 in the name of John K. McGee, and assigned to the assignee of the subject application. Hereinafter the aforesaid two patents will be referred to respectively as "Case I" and "Case II". The cross reference to these two cases is made for the purpose of setting forth the background environment of the present invention and for the purpose of providing descriptive material which is, for the sake of brevity, omitted from the present application and which may facilitate a full and complete understanding of the present invention.

BRIEF SUMMARY OF THE INVENTION

The present invention relates in general to the control of machine tools and the like, and in particular to methods and apparatus for controlling the movable elements of a machine tool by a numerical contouring or point-to-point control system, and wherein two members of the machine or machine tool are both independently movable along a common axis.

As will be explained in more detail below, it is often the current practice to construct the more sophisticated machine tools with a relatively large plurality of "axes", i.e., directions along which relative movement between a cutter and a workpiece may be effected by a multi-axis numerical control system. The several different axes are usually given letter designations according to industry-standard nomenclature, e.g., X, Y, Z, B and W axes. Conventionally, Z axis motion is parallel to the axis about which a cutter (such as a drill, boring tool or ball end mill) rotates, and is thus parallel to the longitudinal axis of an axially movable tool-carrying spindle. In some machine tools, the workpiece is mounted on a table supported on a saddle, the latter two being respectively movable relative to a base in mutually orthogonal horizontal directions, and the spindle-carrying headstock is movable vertically along a column. In such an exemplary arrangement, relative motion between the cutter and the workpiece may occur along X and Y axes, defining a plane normal to the Z axis, by respectively moving the table or the headstock. But the workpiece may also be moved toward or away from the spindle in a direction parallel to the spindle axis, and thus along what is called the W axis, by movement of the saddle. Since the W axis motion of the saddle is parallel to the Z axis movement of the spindle, these latter two machine members are independently movable along what is really a single, common axis which may logically be called the w, z axis. When the saddle is commanded to move the workpiece toward or away from the spindle, the motion may be termed W motion; and when the spindle is commanded to move the cutter carried therein logitudinally toward or away from the workpiece, the movement may be termed Z motion. But in reality, both such motions are along only a single axis (herein designated by the two lower case letters wz), and in a broad sense produce equivalent movement or positioning of the cutter tip relative to the workpiece.

The practical difficulty of such an arrangement, where the control of W and Z positioning movements are carried out independently by a numerical control director (in the same sense that X and Y axes are independently controlled by such a director), is that the programming of successive and different W and Z axis end point positions by randomly and alternatively using W and Z commands (as is often desired) requires the programming technician carefully to "keep track" of all W and Z axis moves in order to know where the spindle will be located, at any time during the progress of the program, relative to the part coordinate origin of a workpiece movable with the saddle. Unless the operator carefully keeps track of these successive end points to be reached by the different W and Z moves which he calls for, he cannot accurately formulate successive blocks of command data which contain W and Z end point commands numerically expressed in part coordinates, i.e., which will bring the cutter to a newly desired position, designated and measured in part coordinates, relative to the workpiece.

It is the general aim of the present invention to simplify, and to render more convenient and foolproof, the programming of successive end point positions to be reached by a first member relative to a second member where both members are independently movable along a common axis. Conjointly, it is an object of the invention to provide a new and advantageous method and apparatus for the numerical control of two machine tool members which are independently movable along a single axis.

In a more specific sense, a further object is to make it possible for a programming technician to formulate a succession of numerical commands for moving both first and second members to successive positions along a single axis, and wherein the numerical commands for at least one, and indeed both of such members, may be expressed simply as coordinate distances referenced to some origin on, or having a predetermined fixed location relative to, the workpiece. The programmer therefore need only consider the engineering drawings for the part to be machined, and need not consider, at least in any crucial sense, the positions to which the respective members must move in machine coordinates referenced to an origin fixed on the machine base.

Another object is to provide a method and apparatus for accomplishing the foregoing in a multi-axis contouring system of the iterative computation type disclosed in Case I and Case II, and further characterized by the incorporation of very simple and inexpensive supplements to the basic method and apparatus there disclosed. Indeed, it is an ancillary object to provide for automatic W, Z "tracking" in a numerical contouring system of that type so that all input commands, formulated by a programming technician for the W, Z axis end point positions, may be expressed completely in part coordinates as contrasted with machine coordinates.

BRIEF DESCRIPTION OF THE DRAWINGS

The foregoing and other objects of the invention will become apparent as the following description proceeds and is taken in conjunction with the accompanying drawings, in which:

FIG. 4 is a diagrammatic side elevation of the machine tool shown in FIG. 1, and illustrates the change in end point positions which occurs when an exemplary W command is executed; and FIG. 5 is similar to FIG. 4 but illustrates the change in positions which occur when an exemplary Z command is executed.

While the method and apparatus of the present invention will be described in some detail with reference to a particular, exemplary embodiment, there is no intention that the invention be limited to such detail. On the contrary, it is intended here to cover all modifications, alternatives and equivalents which fall within the spirit and scope of the invention as defined by the appended claims.

DETAILED DESCRIPTION

Figure 1:
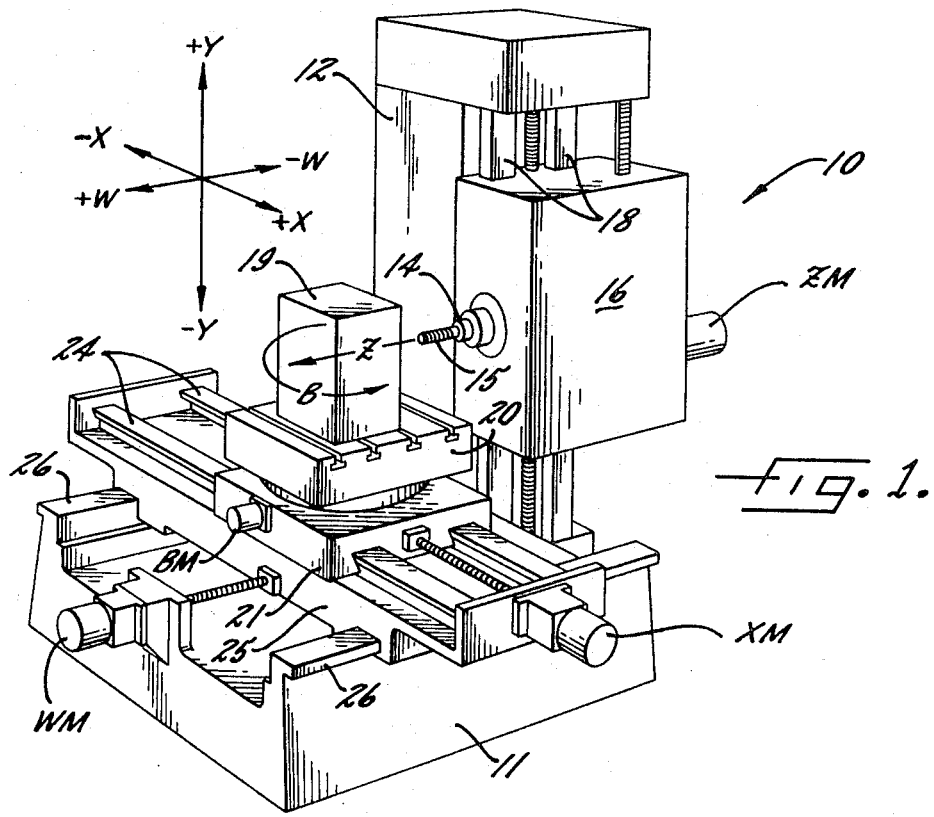
FIG. 1 is a simplified and somewhat diagrammatic perspective view of an exemplary multi-axis machine tool having two of its members movable along a single axis.

The horizontal boring, milling and drilling machine 10 shown in FIG. 1 as an exemplary machine tool includes a base 11 and a column 12 as the supporting structure for the several relatively movable elements or members. A spindle 14 adapted to receive a cutter 15 is disposed in a headstock 16 vertically movable along ways 18 of the column, and the spindle is rotatably driven at a controlled speed by a spindle motor and gearing (not visible). The spindle 14 is axially movable lengthwise (along what is termed the Z axis) by a servomotor ZM associated with appropriate gearing or drive mechanism acting upon the quill in which the spindle is journaled. The cutter 15 is disposed for acting upon a workpiece 19 which is locked to a work-supporting pallet 20 angularly movable and positionable (in a rotational direction here called the B axis) relative to a machine table 21 by action of a B axis servo motor BM and an appropriate connecting mechanism. The table 21 rests upon and is horizontally slidable back and forth along ways 24 formed on a saddle 25. The table is thus movable along what is here identified as the X axis of the machine by a suitable servomotor XM coupled to the table by a driving mechanism such as a lead screw and nut. The saddle 25 in turn is horizontally movable and positionable along ways 26 formed on the base 11 under the control of a servomotor WM and an appropriate drive mechanism such as a lead screw and nut. The saddle movement in an inwardly or outwardly direction is parallel to the rotational axis of the spindle 14, and thus parallel to the Z axis, and such movement is said to be along the W axis.

In this "five axis" machine tool, the X, Y and Z axes are mutually orthogonal, and thus by simultaneously effecting plural axis component displacements at controlled and properly proportioned axis velocities, the cutter 15 may be moved relative to the workpiece 19 along any desired resultant path segment in space, and at a desired resultant path velocity, called feed rate. Such successive path segments may be effected by linear, circular or parabolic interpolation through controlled energization of the several reversible axis servomotors from a multi-axis numerical control "director" of any suitable type familiar to those skilled in the art. Moreover, the invention to be described can be applied with good advantage in point-to-point positioning systems which do not have contouring capability. For purposes of the present description, however, it will be assumed that the machine tool shown in FIG. 1 is controlled by a contouring director of the type illustrated and described in detail in Case I. This contouring director is generally illustrated in block form by FIGS. 3A and 3B in the subject application, and the basic organization and operation of the several components there shown only in block form will be fully understandable to those skilled in the art after reading Case I or after reading both Case I and Case II.

Figure 2:
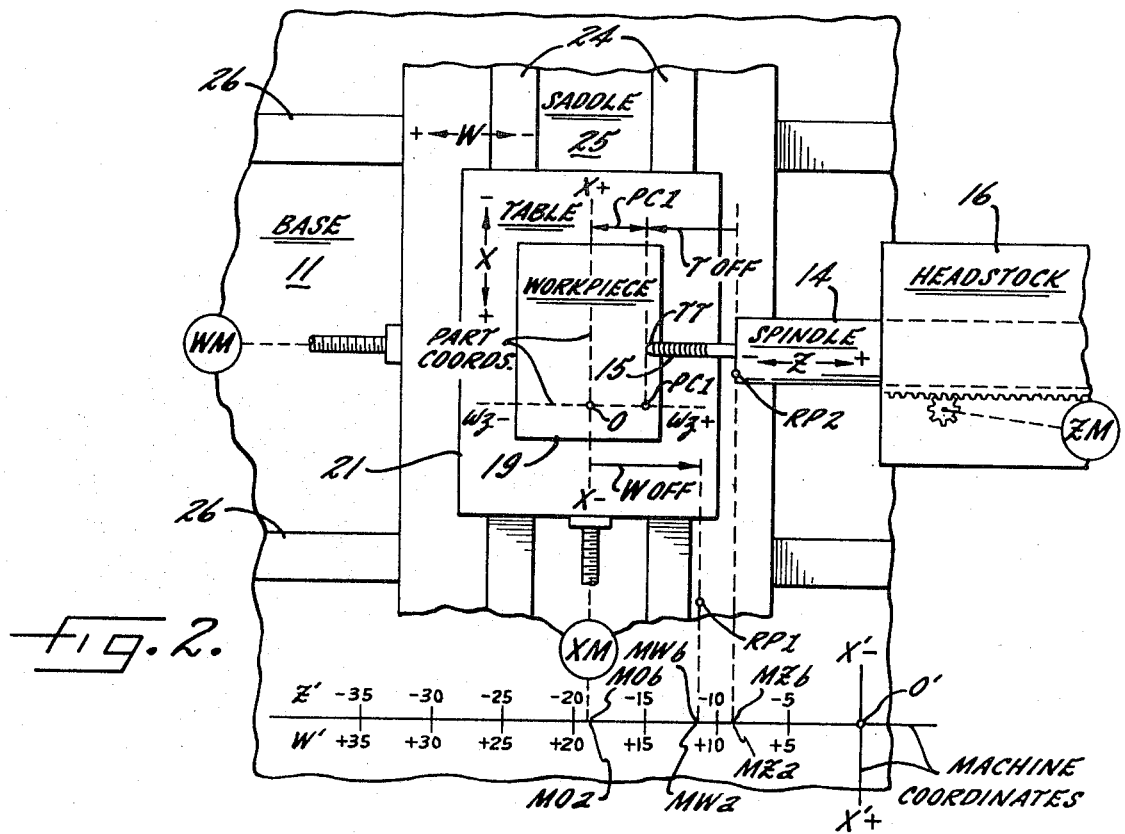
FIG. 2 is a diagrammatic plan view of the principal elements or members of the machine tool shown in FIG. 1, and illustrates the directions of the axes, the senses of movement along the axes, and the origins or reference points associated therewith.

FIG. 2, in the form of a diagrammatic and fragmentary plan view of the machine tool of FIG. 1, makes clear the relationships of the several movable parts of the machine tool and its X, Z and W motions. For purposes of description in the present application, the Y and B axes of motion can be ignored, and a two-axis control system may be considered to involve the X axis motions of the table 21 (by which the workpiece 19 is positioned horizontally in a direction normal to the spindle axis) and a second wx axis which lies in a horizontal direction and is constituted either by motion of the saddle under the control of the servomotor WM or the motion of the spindle under the control of the servomotor ZM.

It will be understood that each of the axis servomotors is associated with a servo system adapted to receive changing numerical input signals which digitally represent the desired positions to which the respective movable machine members are to be located. Each such servo system includes some appropriate position-sensing feedback device (not shown here), such as a resolver or an Inductosyn (T.M.) slider and scale, which produces a signal either indicative of the actual position of the machine member or the difference between the numerically signaled desired position and the actual position. In response to any error between the desired and actual positions, the servomotors are energized to translate their respective machine members in a direction to reduce the error to zero. Such servos are usually constructed so that the instantaneous or following error is substantially zero or negligible as the numerically signaled value of the desired position dynamically changes. The details of suitable digital servo systems which accept input signals representing changing numerical values are disclosed and described in Case I by FIGS. 9a, 9b, 9d, 38a, 38b, 38c, 40a, 40b, 40d and at Column 99, line 70 to Column 104, line 63. These portions of the Case I are hereby incorporated by reference for completeness.

The numerical values represented by input signals to the respective individual servo systems have significance only with respect to some datum point or origin on the machine tool itself. That is, the actual position-sensing and feedback devices can only provide signals which are referenced in machine coordinates to some point of origin, and thus the input signals to the servo systems must be similarly referenced. On the other hand, the programming technician who prepares successive sets or blocks of numerical program information will, as a matter of convenience, desirably prepare blocks of program data numerically defining successive end point positions to be reached by the cutter along the respective axes in terms of "part coordinates", i.e., numerically valued coordinate positions referenced to a datum point on or fixed with respect to the workpiece itself. In this way, the programming technician can work directly from a drawing of the workpiece, and need not be concerned with the particular relative location in which the workpiece is mounted upon the machine tool table or platform.

As shown in FIG. 2, part coordinates are measured along "part axes" $wz$ and X having an origin 0 on or fixed relative to the part blank or workpiece 19. The position of a tool tip TT relative to the origin 0 is expressible as a numerical abscissa measured along the part axis $wz$ and as a numerical ordinate along the part axis X. As here shown, the tool tip is located at the abscissa PC1 along the $sz$ axis, which is a way of saying that the machine members 14 and 25 are positioned to make the "part coordinate" position equal to PC1.

The servo system which includes the saddle servomotor WM controls the location of the saddle 25 such that a reference point RP1, on or fixed relative to the saddle, reaches some commanded abscissa in "machine coordinates". The machine coordinates are measured along "machine axes" W' and X' having an origin 0'. It may be assumed that the origin 0' is located at some point on the base 11 so that it is appropriate also to use the term "base coordinates" as a synonym for the term machine coordinates. When the workpiece 19 was fixed to the table 21, its origin 0 was offset by a distance WOFF from the reference point RP1, such offset here being shown as extending in a negative direction along the base axis W'. In the present example, when the part origin 0 is at a machine coordinate location $Mo_a$, the reference point RP1 is at a machine coordinate location $MW_a$, the difference in their numerical values being WOFF. Remembering that WOFF as shown in FIG. 2 is a negative offset, the relationship may be expressed as $MW_a = Mo_a + WOFF$.

The spindle servo system which includes the servomotor ZM operates to position a reference point RP2, on or fixed in relation to the spindle, relative to a machine axis, also having as its origin the point 0'. The Z' axis is the converse (i.e., opposite sign) of the W' axis because motion of the spindle toward the left as viewed in FIG. 2 results in a decrease of the part coordinate PC, and thus a decrease (increase in a negative sense) in the corresponding Z' coordinate value. In the example shown, the spindle is at the coordinate location $MZ_b$ and the tool tip TT is offset to the left by a distance TOFF along the Z' coordinate scale. The tool offset TOFF is in a negative direction along the Z' axis but a positive direction along the W' axis; and its magnitude may be changed from time-to-time as tools of different lengths are placed in the spindle.

It becomes apparent from FIG. 2 that saddle machine coordinate $MW_a$ on the coordinate scale W' corresponds to the coordinate $MW_b$ on the coordinate scale Z', where $MW_b = -MW_a$. Similarly, the spindle machine coordinate $MZ_b$ on the Z' scale corresponds to $MZ_a$ on the scale W', where $MZ_a = -MZ_b$. But the really important position parameter, that is, the value of the part coordinate PC, may be increased in a positive sense either by moving the saddle to the left (positive W motion) or by moving the spindle to the right (positive Z motion). On the other hand, the part coordinate PC may be changed in a negative sense (so that it becomes less positive or more negative) by moving the saddle to the right (negative W motion) or by moving the spindle to the left (negative Z motion). Stated another way, each time the saddle moves to a new position along the W' axis, the part coordinate PC changes even though the spindle does not move and the spindle machine coordinate $MZ_b$ does not change. Likewise, each time the spindle moves to a new position along the Z' axis, the part coordinate PC changes even though the saddle does not move and the saddle base coordinate $MW_a$ does not change. If the control system which supplies changeable numerical input signals to the W and Z servos acts entirely independently in response to W and Z command numbers read from a program tape, and if those programmed numbers are expressed in part coordinates, errors will inevitably arise because the position of either the saddle or the spindle which must be reached in base coordinates to establish the desired $wz$ part coordinate value will differ as the spindle or the saddle, respectively, are moved to different machine coordinate locations.

In carrying out the present invention, a numerical control system is provided with its basic input data in the form of successive sets (blocks) of numerical command data which represent successive desired end point positions in part coordinates, i.e., the location which the tool tip TT disposed on one of the movable members 14, 25 is to reach relative to a point (origin 0) of the other of those members. Essentially any commanded $wz$ part coordinate position can be reached by either W or Z movement depending upon whether the program input block contains a W or a Z address character. Then, the difference between the previous and the new programmed part coordinate values is added both to a changeable part coordinate command number and to a changeable machine coordinate number representing the machine position of one of the two members. The latter machine coordinate number is always included as a changeable term in a summation of values which establishes the servo input number signal for the other member. In this way, both the W and Z servo systems are supplied with changeable input numbers in machine coordinates which take on values to move either the saddle or the spindle to machine positions (expressible as coordinates $MZ_a$ or $MZ_b$ as labeled in FIG. 2) which produce the desired part coordinate position (PC, as labeled in FIG. 2). The method and apparatus summarized in the preceding portions of this paragraph will be more fully understood as the following description of an improved numerical control director proceeds.

A. The Numerical Control Director

Because the basic numerical control director associated with the machine tool 10 (FIG. 1) is relatively complex and has been fully described in Case I, needless repetition in the subject application is desirably avoided by cross reference to that case. Only a generalized block diagram of the director containing the improvements of the present invention is set forth in FIGS. 3A and 3B; and the reader may refer to Case I and Case II for details.

Figure 3A:
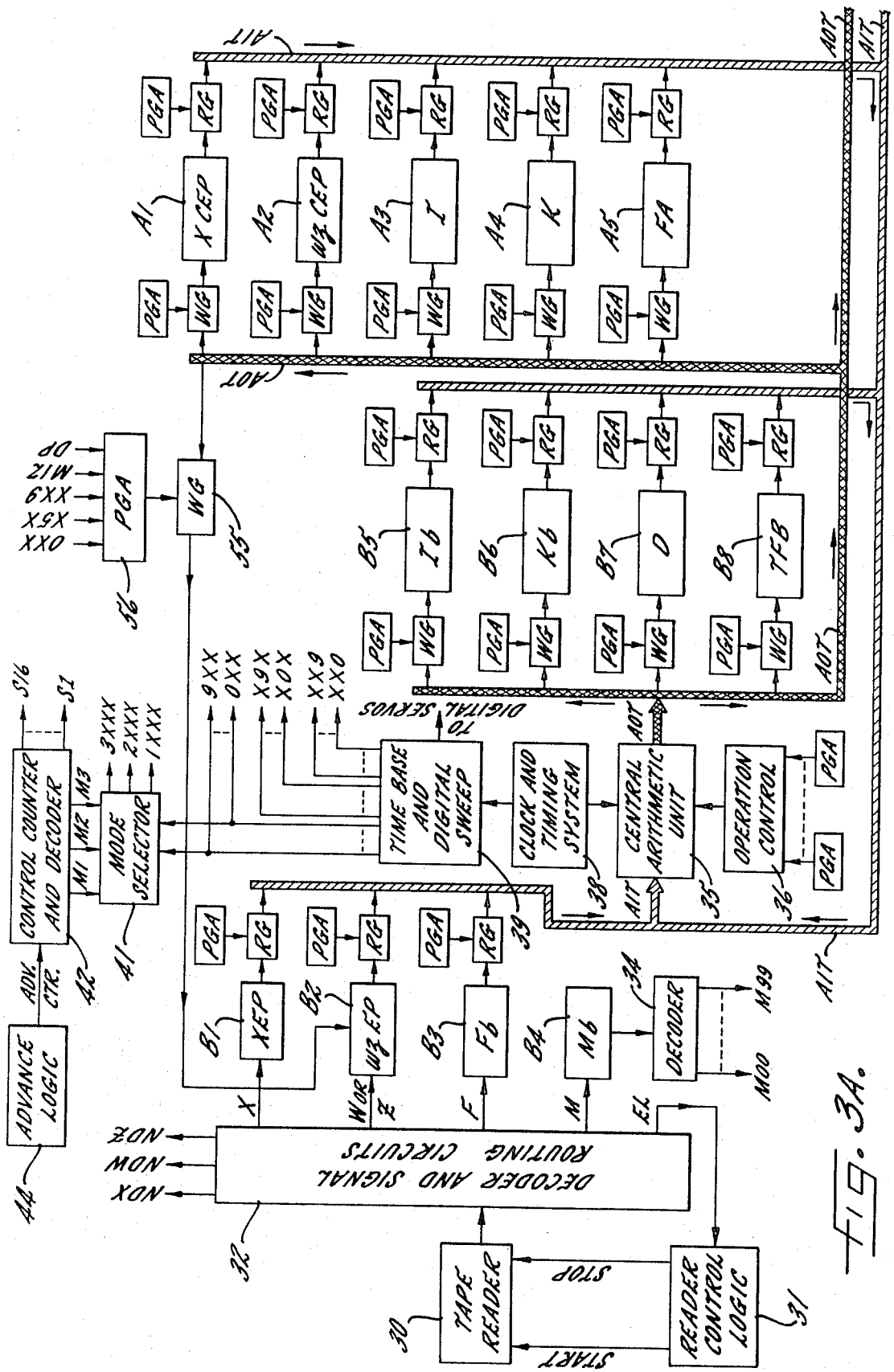
FIGS. 3A and 3B, when joined together as indicated, form a block diagram for a numerical control system of the general type disclosed in Case I and Case II, but supplemented to constitute an exemplary embodiment of the present invention.

As shown in FIG. 3A, a tape reader 30 is adapted to receive and "read" the successive blocks of digital, alpha-numeric data recorded on a suitable record medium, such as a punched paper tape (not shown). The format of information stored on a punched paper tape and the details of the tape reader are familiar to those skilled in the art of numerical controls. It may be noted briefly, however, that the tape reader is associated with reader control logic circuits 31 which cause starting when a new block of data is required by the system and which cause stopping when one complete block of data has been read. Also, the tape reader produces output signals, in binary coded form representing one character at a time, which are passed to a decoder and signal routing circuits 32. Each multi-character "word" is preceded by an address character. For example, a "block" of command data calling for the cutter tip TT (FIG. 2) to reach a part coordinate position PC = 10, and X = 8 might contain the nine words N125, X+080000, Y+023000, W+100000, F150, S200, G01, M35, EL. In this example, the N word designates block No. 125 in the sequence of blocks making up an entire program; the X word calls for an X axis part coordinate position of +8.0000" to be reached by the tool tip (as a result of travel of the table 21 from its previous position) as an end point; the Y word calls for the tool tip to reach as an end point a position of +2.3000" along the part coordinate scale for the Y axis by movement of the headstock 16 from its previous position; the W word calls for a $wz$ axis part coordinate position of +10.0000" to be reached by the tool tip relative to the origin 0 by travel of the saddle 26 from its previous position; the word F150 designates that the resultant of the three component axis motions is to be accomplished at a feed rate of 15" per minute; the S word value of 200 indicates that the spindle is to be operated at 200 R.P.M.; the G word of 01 is a mode designator code which here indicates that the director is to be operated with linear (as constrasted to circular) interpolation; the M word value of 35 is an auxiliary code which might, for example, designate that the cutter cooling fluid supply (not shown) is to be turned on; and the EL word simply signifies that the last line of character of one block of data has been read from the punched tape. When the EL signal is received and decoded, it causes the tape reader to stop, and the reader will be restarted by the control logic 31 when the director requires the next block of command data.

For purposes of describing the present invention, it is not necessary to consider the N, Y, B, S and G word signals which may be produced in response to reading of any given block of command tape data. For this reason, the signal-receiving and processing components for these words are not here shown or described. In the interest of simplification, only output trunks which receive and transmit X, W or Z, F, M and EL words are shown extending from the signal routing circuits 32 in FIG. 3A. Those skilled in the art will understand fully that when any X word is read, its numerical value is represented by signals which are transmitted to and stored in a buffer register B1 whose stored number is here designated XEP. Similarly, the signal routing circuits 32 respond to either a W or a Z word sensed by the tape reader 30 by supplying the numerical value of that word to a buffer storage register B2 whose stored number is designated $wz$EP. The lower case combination of the letters $wz$ is here used as a shorthand designation meaning "$w$ axis or $z$ axis", in view of the fact that any desired end point position expressed numerically in part coordinates can be reached by movement of either the saddle 25 or the spindle 14. When a new numerical value is read into the buffer register B2, there will simultaneously be produced (in a manner well known in the art) signals from the decoder and routing circuitry, indicating that either a new Z word or a new W word has been sensed by the tape reader 30. These signals are here labeled NDZ and NDW, indicating a "new data Z" or "new data W" and they will respectively reside in a "logic 1 level" only when the last-read block of information contains a W word or a Z word. As a programming rule, any one block of command data cannot contain both a W word and a Z word.

In similar fashion, the numerical value of any F word is stored in a buffer register B3 and Fb; and a numerical value of any M word read from a punched tape will be stored in a buffer register B4 as Mb. The latter register is directly associated with a decoder 34 which thereupon produces a logic 1 output signal on the corresponding one of one hundred output lines here labeled M00 through M99.

For further details of the tape reader 30, its control logic 31, and the decoder and routing circuits 32, reference is made to these FIGS. 40$m$ and 40$l$, to FIGS. 9$m$ and 9$k$, and to Column 27, line 58, through Column 33, line 13 in Case I.

In Case I, a numerical control director is described in some detail as controlling two axes (specifically X and Y axes) of motion although it is apparent that additional axes may be simultaneously controlled by duplication of certain portions of the apparatus and method steps. The present application will similarly treat two axes of control, but in this instance, those two axes will be designated as the X and $wz$ axes. It will be understood that all of the data processing components and procedures described in Case I and Case II for the Y axis are used in the exemplary embodiment here to be described, but they are to be considered as applying to a $wz$ axis rather than a Y axis. In other words, in reading Case I and Case II for supplemental information pertaining to the present disclosure, all of those portions relating to a Y axis are to be considered as now relating to a $wz$ axis and thus pertaining to the control of end point positioning by motion of the saddle 25 or the spindle 14 along a single common axis.

Referring again to FIG. 3A, a central arithmetic unit 35 (sometimes here called an "adder" for brevity since it may algebraically add, and thus arithmetically add or subtract, and may by sequential addition or subtraction steps perform multiplication, division or other arithmetic functions) has multi-conductor input and output trunks AIT and AOT which extend throughout the director system. Two numbers supplied successively to the adder input over the trunk AIT will be added together, subtracted, compared or otherwise manipulated according to control signals supplied from an associated operation control 36, and the result will then appear in an answer register or accumulator within the adder so that signals representing the answer or result appear on the conductors of the output trunk AOT. Although details of such a central arithmetic unit 35 may vary, and are familiar to those skilled in the art, cross reference is here made to Columns 34–38 and FIGS. 9$f$, 9$c$ and 14 in Case I for the specific organization of, and the symbols associated with, the central arithmetic unit 35.

Figure 3B:
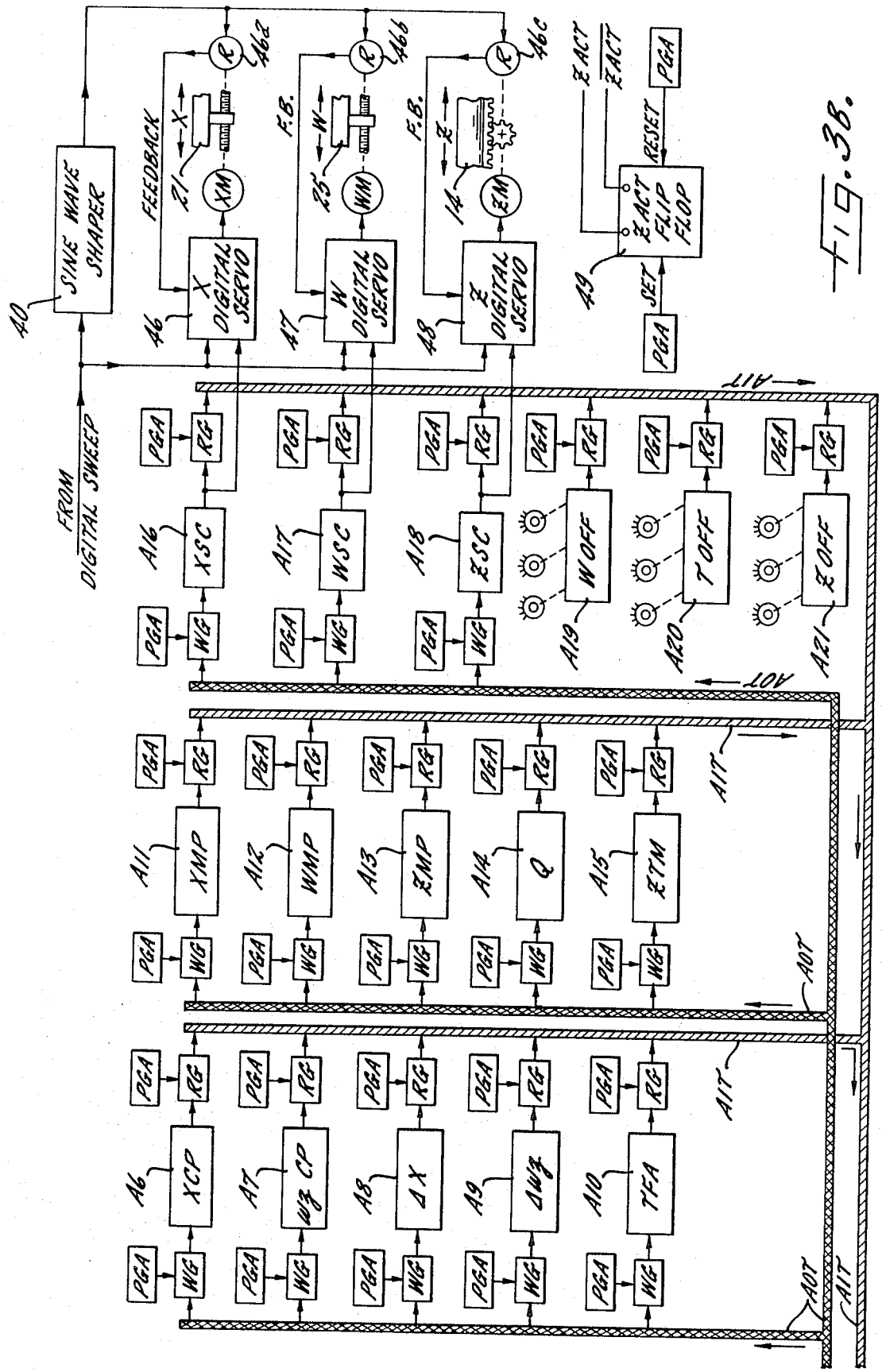

The entire director of FIGS. 3A and 3B is "timed" so that it functions in successive, iterative time steps of a predetermined short duration (for example, twenty microseconds) within successive cycles of predetermined duration $\Delta T$ (e.g., twenty milliseconds) by a clock and timing system 38 associated with a time base and digital sweep 39. The latter produces a reference squarewave at a chosen frequency (e.g., 500 hz.) which is transmitted to a sine wave shaper 40 for the digital servo systems in FIG. 3B. It also produces timing step signals 000 to 999 during each cycle, as labeled in FIG. 3A, there being ten timing output lines for unit digit values xx0 to xx9, ten timing output lines for tens digit values x0x to x9x, and ten output lines for hundreds digit values 0xx to 9xx. A particular combination of three lines will receive a logic 1 voltage during each of the 1000 time steps which occur sequentially within each cycle period $\Delta T$. By connecting the three appropriate timing output lines to an AND gate, an enabling signal during any particular time step within a cycle can be obtained and used to perform gating functions such as the reading or writing of a number stored in some register into or from the adder 35. The time base and digital sweep 39 further supplies signals to a mode selector 41 associated with a control counter 42 having state output lines S1 through S16, and which is advanced in its count state by signals from an advance logic unit 44. In this way, mode signals 1, 2 and 3 are produced during different timing cycles so that different types of operations can be carried out within the span of a time cycle $\Delta T$ according to the particular mode which is then in effect. The components 38, 39, 41, 42 and 44 are all described in detail at Columns 19–27 with reference to FIGS. 9b, d, e; FIGS. 10a, b, c; FIG. 11; and FIGS. 40b, d, e in Case I, to which cross reference is made for details which need not be repeated here.

Besides the buffer registers B1-B4 which receive the tape-read numbers XEP, wzEP, Fb and Mb, the system of FIGS. 3A and 3B includes buffer registers B5–B8 which initially receive computed numbers from the adder 35 after initial "data processing" operations on one block of information read from the program tape. As here labeled, the registers B5–B8 respectively receive numbers representing Ib, Kb, D and TFB. The symbol Ib designates the X axis component of a path segment defined by a data block last read from a program tape; the symbol Kb designates the wz axis component of that path segment; the symbol D represents the composite length of that path segment; and the symbol TFB represents the "time factor" for that path segment. The significance of these symbols will be apparent from Case I and particularly from FIG. 5a in Case I which shows a typical path segment extending from a first point to a second point, with the segment length being D and the X and Y axis components of that segment being I and J. In the present case, since a wz axis instead of a Y axis is being considered, the wz component K takes the place of the Y axis component J described in Case I.

By cross reference to Columns 6–9 and FIGS. 5a, b in Case I, it will be understood that a numerical quantity Q is formulated and signaled according to the relationship:

$$Q = V \cdot \Delta T / \sqrt{I^2 + K^2} = V \cdot \Delta T / D \qquad (1)$$

The quantity Q is used to compute the small axis macromoves $\Delta X$ and $\Delta wz$ to be executed during each short time period $\Delta T$ according to the relationships:

$$\Delta X = I \cdot Q \qquad (2)$$
$$\Delta wz = K \cdot Q \qquad (3)$$

As explained fully in Case II at pages 13–16, the quantity Q may be viewed as the product:

$$Q = V \cdot TF \qquad (4)$$

where $$TF = \Delta T / D \qquad (5)$$

The quantity TF is called a time factor and it may be utilized to compute the quantity Q. If $\Delta T$ remains constant (e.g., always has a value of twenty milliseconds) then the time factor TF will change as successive different blocks of information, calling for different path segment lengths D, are read in the tape reader 30. The number TFB held in register B8 is simply the time factor for the last-read block from the program tape, as fully explained in Case II.

The remaining storage registers labeled A1 through A21 in FIGS. 3A and 3B may all be considered active registers which hold changeable value numbers representing different variables. They are active because they are used in the computations which generate the final changing number signals supplied to the servo system inputs to cause the movable members to progress from one end point to the next as commanded by data derived from a block of information earlier read from the programmed tape. The data in the active registers are thus called "active block data." If a given block is numbered n, then it may be said that when block n data is in the active registers and the machine tool members are being moved to produce component axis motions resulting in composite movement along the n block path segment, the tape reader 30 is started to read the (n + 1) block from the program tape into buffers B1–B4. Those newly read data are processed to produce new values of the Ib, Kb, D and TFB numbers which are stored in buffers B5–B8. Thus, while block n is being executed by movement of the machine tool members to commanded end point part coordinates $X_n$, $wz_n$, the new values of XEP and wzEP become equal to the part coordinate numbers $X(n + 1)$, $wz(n + 1)$. Also, the buffers B3, B4 may receive new Fb and Mb numbers. New values are computed for Ib, Kb, D and TFB; and these new values are stored in buffers B5–B9.

Then, when block n is fully executed, the information in the buffer registers is transferred to the active registers so that the active block becomes (n + 1); and the tape reader 30 is started to read in block (n + 2) information from the program tape. More specifically, the first part of this transfer procedure involves reading the buffer numbers Ib and Kb from buffers B5 and B6 into the active registers A3 and A4, where they become the active values I and K. The numbers XEP and wzEP are read from buffers B1 and B2 and written into active registers A1 and A2 where they become the new active numbers XCEP and wzCEP—thus representing the end point part coordinates to be reached. The numbers TFB and Fb are read from buffers B8 and B3 and written into active registers A10 and A5 where they become the active time factor TFA and the active feed rate FA. The system then proceeds to supply changing numerical input signals to the servo systems so that the newly transferred block is executed immediately following completion of the preceding block.

All of the buffer and active registers which may be desirable for a complete numerical control director (as described in Case I and Case II) are not here shown, but those which appear in FIGS. 3A and 3B will serve to make clear the method and the apparatus for carrying out the present invention. The remaining active registers shown in FIGS. 3A and 3B hold numbers which are changed by iterative computations, as described in Case I and Case II. By way of review, the nature of these changing numbers may be briefly summarized:

Registers A6 and A7 hold target part coordinate values XCP and wzCP which are updated during each cycle period $\Delta T$ by macromove amounts $\Delta X$ and $\Delta wz$.

Registers A8 and A9 hold the macromove numbers $\Delta X$ and $\Delta wz$ applicable for the $X$ and $wz$ axes, and which are computed such that their magnitudes are proportional both to the desired path feed rate number FA and the magnitudes of the respective axis components $I$ and $K$.

Registers A11, A12 and A13 hold numbers XMP, WMP and ZMP which represent in machine coordinates the target positions to be reached during each cycle period $\Delta T$, these numbers taking into account any applicable offsets (and at least one of these numbers being especially formulated as hereinafter described).

Register A14 holds the number $Q$ which is periodically computed as being equal to the product of $V$ and TFA, where $V$ is the desired path velocity which is equal to or derived from the commanded feed rate FA. The number $Q$ is used to compute the values of $\Delta X$ and $\Delta wz$, as noted above.

Register A15 holds a changeable number ZTM which represents the position of the spindle 14 in machine coordinates, and specifically in machine coordinates which are the converse of the machine coordinates for the saddle 26.

Registers A16, A17 and A18 hold servo command numbers XSC, WSC and ZSC which form the changing signaled inputs to the $X$, W and Z digital servo systems. These servo input numbers are progressively updated and the servo systems act to keep their respective movable members positioned in accordance with the changing numerical values.

Registers A19, A20, A21 are storage registers which signal numbers representing offsets WOFF, TOFF and ZOFF. Such numbers may be derived in the adder and read into these offset storage registers, but in a preferred and simplified form, the registers may be constituted as sets of digit switches permitting the desired values to be manually dialed in by setting knobs or thumb wheels here shown. The three offset numbers are not frequently changed.

In general, the active registers are identical in organization and operation to those shown and described in Case I, especially in FIGS. 9 and 40 and at Columns 33 and 34, to which cross reference is made. Except for the WOFF, TOFF, ZOFF and ZTM numbers, the symbols here used are the same as those employed in Case I (except, as noted above, that wz replaces Y as an axis designation). The TFB and TFA numbers are not specifically treated in Case I, but registers for these latter numbers, and the control of such registers, are described in Case II, to which cross reference is also made. In any event, the TFB and TFA registers are not in any sense critical in carrying out the present invention.

It will be helpful to note briefly that substantially all of the buffer and active registers B1–B8 and A1–A21 have read gates RG which lead from the register output to the adder input trunk AIT. They further have write gates WG interposed between the adder output trunk AOT and the register input. When any read gate RG is enabled (opened), the stored binary signals, and thus the stored number, from the associated register is fed via AIT to the adder input, and without destroying or changing the stored number. On the other hand, when any write gate WG is enabled (opened), the signals then existing on the adder output trunk AOT are transferred into the associated register, destroying the contents previously held in that register. The buffers B1–B4 normally do not require write gates because they receive input signals directly from the decoder 32; and the active registers A19–A21 do not necessarily require write gates since, as here shown, the stored numbers may be created or changed by manually setting thumb wheel digit switches.

In order to time and control the reading and writing of signals from or into the various registers, each read gate RG and each write gate WG, is controlled by a "program gate array" PGA. Moreover, several PGA's are used in other locations to produce properly timed and programmed control signals, as shown for example in association with the adder operation control 36. This drawing symbolism for the several PGA's in FIGS. 3A and 3B will be fully understood after reference is made to Case I, particularly Columns 39 and 40. Merely by way of example, if it were desired to read the $\Delta X$ number contained in the register A8 into the adder during program step 748, then a three-input AND gate may be used as the PGA associated with the read gate RG for that register; and the three inputs for that PGA would be connected to the units "8", "tens 4" and "hundreds 7" output lines of the time base and digital sweep 39. If such reading of the $\Delta X$ number is to occur only in Mode 2, and when the control counter 42 is in state S7, that AND gate would be further qualified with inputs from the 2xxxx and S7 control lines leading from the mode selector 41 and counter 42. By building a plurality of such AND gates acting through OR gates, any PGA may be constructed so that it produces an output signal, and enables the associated read or write gate during each of several different predetermined programming time steps.

Rather than to show by symbols written into each PGA block all of the conditions under which that PGA produces an output control signal, reference will be made in this application to appended programming Tables I through IV. With the background information set out in Case I, any person skilled in the art will know immediately how to construct any or all of the program gate arrays PGA here shown.

The three servo systems which include the respective servomotors XM, WM and ZM are diagrammatically illustrated in the right portion of FIG. 3. These servo systems will be fully understood from the cross reference made above to Case I. Briefly, however, the servo circuits 46, 47, 48 are all substantially identical; each one receives a corresponding one of the changeable input signals representing the numbers XSC, WSC, ZSC; each includes a comparator circuit which produces a response pulse at those instants when the digital sweep number (from the time base and sweep 39) agrees with the input number, so that the pulse is "phased" relative to the output of the sine wave shaper 40 according to the value of that input number; the output of the sine wave shaper 40 (in the form of two sinusoidal voltages in phase quadrature) is applied as excitation signals for resolvers 46a, 46b, 46c mechanically driven according to motions of the respective controlled members 21, 25, 14; each resolver supplies a feedback signal which is phased relative to the digital sweep according to the resolver rotor's angular position and thus according to the linear position of the controlled member; each servo circuit contains a phase discriminator to produce a dc. output voltage which is agreeable in polarity with, and proportional in magnitude to, the phase difference between the comparator pulse and the feedback signal; and such dc. voltage is applied to the corresponding servomotor XM, WM or ZM to make the latter operate in a direction and at a speed corresponding to the sense and magnitude of that phase difference. As the numbers XSC, WSC and ZSC progressively change, therefore, the servomotors XM, WM and ZM move the associated table 21, saddle 25, and spindle 14 to keep the positions of the latter dynamically in agreement. Of course, if anyone of the input numbers XSC, WSC, ZSC is not changing in value, the corresponding servomotor is deenergized, and the corresponding machine tool element remains stationary. Because of the dynamic response of the servo systems, the phase difference and the following error never exceed amounts corresponding to one-half revolution of the associated resolver, and thus the numbers XSC, WSC and ZSC need only be signaled in the four lowest order digit places of a seven or eight digit number representing the desired machine coordinate position, as fully explained in Case I. It is to be realized, however, that the servo input numbers XSC, WSC and ZSC are based on the lowest order digit values of the machine coordinate numbers XMP, WMP, ZMP and the latter must be complete numbers in order to accommodate offsets and must be expressed in machine or base coordinates since the resolvers 46a, b, c are mechanically coupled to their corresponding machine elements so that they can only supply feedback intelligence which is valid in terms of machine coordinates.

Finally, the apparatus shown in FIG. 3B includes a control flip-flop 49 which is set or reset (i.e., enabled or cleared) under certain conditions and during certain program time steps. For this purpose, two PGA's are connected to supply their output signals to the set and reset terminals of the flip-flop 49. When in the set state, the flip-flop makes its outputs ZACT and $\overline{ZACT}$ reside at logic "1" and "0" voltage levels; and when the flip-flop is in the reset state, these outputs reside at logic "0" and "1" voltage levels. As will be made clear below, the flip-flop 49 thus produces a logic 1 ZACT signal when positioning movement along the wz axis is to be accomplished by motion of the spindle 14, i.e., when the Z servo system is to be active; and it produces a $\overline{ZACT}$ logic "1" signal when the spindle servo is inactive and wz positioning movement is to be accomplished by the W servo system and the saddle 25. The physical organization of the flip-flop 49 and its associated PGA's will be understood from Case I, where a flip-flop 455' in FIG. 40f serves as an example.

From the foregoing, it will be understood how the several PGA's of FIGS. 3A and 3B are structurally organized to produce output signals properly timed under certain logically specified conditions, and thus the remaining details of the apparatus can be here concretely designated simply by setting forth the sequential programmed operations which are to be carried out. For this purpose, there are appended as the last pages of the present specification Tables I, II, III and IV. These tables are, in all respects excepting those aspects pertaining to the present invention, identical to Tables I through IV in Case II; and all operations and apparatus (excepting for those improvements which constitute an embodiment of the present invention) may be understood fully from reading Case II. It will suffice therefore to note that Tables I through IV in the present application use the axis designation wz in lieu of the designation Y employed in Case I and Case II; and it will suffice to describe here only those sequences of the overall operation which are reflected in present Tables I through IV to the extent that they differ from the corresponding tables of Case II.

B. The Method Steps

Before discussing appended Tables I–IV, the method here to be carried out may be summarized in generalized form. First, in controlling the successive positioning of a part (the saddle 25 including workpiece 19 thereon) relative to a member (the spindle 14 including the tool 15 therein) which are independently movable along a common axis, a first changeable number (wzCP) is signaled (by the register A7) such that its value represents the desired part coordinate position of the member relative to the part. More specifically, this number represents the wz part coordinate PC of the tool tip TT relative to the origin 0 as shown in FIG. 2, and when either the spindle or the saddle is to be moved to change the part coordinate distance PC, the first number wzCP is progressively changed until it equals the newly desired value of that part coordinate PC.

Second, a second changeable number (ZTM) is signaled (by register A15) to dynamically represent at all times the position of the member (spindle 14) in base coordinates measured from a second origin on or fixed relative to a base. More specifically, the second number ZTM represents the coordinate value $MZ_b$ measured along the Z' base coordinate scale relative to the origin 10' as shown in FIG. 1; and when the spindle is to be moved, the number ZTM will be progressively changed.

Third, in response to the signaling of a new value for a command number, i.e., a new W word received from the reader 30, the first number (wzCP) is changed by an amount equal to the difference between the new and previous values of that command number. As will be explained, this is accomplished by subtracting the newly read value of a W command end point, which appears in buffer B2 as the number wzEP, from the previous value which is stored in register A2 as the number wzCEP, thereby to compute the difference K which represents the wz axis component of the desired path segment. The number wzCP is then changed in a sense and by an amount equal to K through repeated functioning of the arithmetic unit or adder 35.

Fourth, the first number (wzCP) is also changed by an amount corresponding to the change in the second number (ZTM) which occurs whenever the member is moved relative to the base. More specifically, if the spindle 14 is moved and the number ZTM changes from a first value $ZTM_1$ to a second value $ZTM_2$ then the number $wz$CP is changed by an amount equal to $[ZTM_2 - ZTM_1]$ through operations of the adder 35.

Fifth, the movable part (saddle 25 including workpiece 19) is moved along the base to keep its position in converse base coordinates always equal to the first number $wz$CP, but offset therefrom by an amount corresponding to the second number ZTM. More specifically with reference to FIG. 2, when the position $MZ_b$ along the base coordinate scale Z' is changed, the number $wz$CP is correspondingly changed, but the servomotor WM is caused to respond such that it keeps the position coordinate $MW_a$ (measured along the converse sign coordinate scale W') equal to $[wz\text{CP} - \text{ZTM}]$. Thus, if ZTM increases by a predetermined amount, $wz$CP increases by the same amount, and the difference $[wz\text{CP} - \text{ZTM}]$ does not change—so that the saddle does not move and, very importantly, the number $wz$CP remains an accurate representation of the part coordinate distance PC.

The foregoing will become more clear as the method and apparatus are now described in greater detail.

C. Data Process Sequences

When a block of data in active storage has been, in effect, fully executed, the control counter 42 advances to state S7 and the logic 1 signal on its output line S7 places the mode selector 41 in the Mode 2 condition, as fully described in Cases I and II. In Mode 2, the operations designated in Table I (common to all modes) and those designated in Table III (applicable particularly to Mode 2) will be carried out during the next cycle period $\Delta T$ represented by the ten columns of one hundred time steps each, as shown in Table I. The data then in the buffer register will be transferred to the active registers, as fully described at pages 96-101 of Case II.

The shorthand language utilized in present Tables I-IV will be fully understandable from Case I, and also from pages 93-96 of Case II. Without further detail, therefore, it may be noted here that during either Column 2300 or 2800 in a cycle period $\Delta T$ for Mode 2 (and as shown in Table III), the Ib and Kb numbers are read into the adder 35 from buffers B5 and B6, individually added to zero, and individually "written" as new values for $I$ and $K$ in registers A3 and A4. Then, the control counter 42 advances to state S8 (see time steps 2382 or 2882 in Table III) and the system goes into Mode 3.

In Mode 3, appended Table IV (along with Table I) is applicable. As shown for time steps 35 to 39 in either the 3300 or 3800 columns of a $\Delta T$ period, the buffer numbers XEP, $wz$EP, TFB and Fb are read from registers B1, B2, B8, B3 and respectively transferred into active registers A1, A2, A10, A5 where they become the new values for XCEP, $wz$CEP, TFA and Fa. On step 3379 or 3879, the control counter advances from state S8 to state S9, so the system is taken out of Mode 3.

At step x991 in Table I and during that same period $\Delta T$, the signal TRR is set to a logic 1 value, and this causes the tape control logic 31 (FIG. 3A) to start the tape reader 30. On steps x992 through x999 the control counter is advanced through successive states, and ends up in state S1 so that the system is returned to Mode 1.

The tape reader now runs until it senses an EL code at the end of the block being read, after which the TRR signal is removed and the tape reader stops. During this reading operation, the data in active storage are being utilized to generate changing servo input signals so that the active block is being executed. And, when the tape reader stops, a logic signal DPR appears to signify that "data processing is required." The buffer registers contain newly read values of XEP, $wz$EP, Fb and Mb. It should be noted specifically, however, that the value of the number $wz$EP which has just been received in register B2 is the value of either a W word or a Z word contained in the tape block which has just been read because no tape block can contain both a W word and a Z word, and the routing circuits 32 send the numerical value of either such word to the buffer B2 where it becomes the $wz$EP number. The latter number thus represents the end point part coordinate to be reached by movement of either the saddle or the spindle when the just-read block of data is executed. On the other hand, information indicating whether that block of data is to be executed by W movement or Z movement is signaled from circuits contained within the decoder 32. More specifically, if a block of data just read contains either a W word or a Z word, then the logic signal NDW or the logic signal NDZ will respectively be set to a logic 1 voltage level.

Referring specifically to appended Table I, the "data process functions 38 there set out differ slightly from those described in Case II, but only the differences will be here described. At step x055 in the x000 column of Table I, the legend EDP ? DPR signifies "enable DP if the DPR signal exists." Thus, the data process flip-flop of Case II will be enabled or set. Time steps 056-059 of Table I will be discussed later in this specification, and it may be observed here that on time steps 060 through 065 the buffer values of Ib and Kb are computed and stored. The equations for these operations are:

$$\text{XEP} - \text{XCEP} = Ib \qquad (6)$$
$$wz\text{EP} - wz\text{CEP} = Kb \qquad (7)$$

More particularly, on time step 060 the number XEP is read from register B1 into the cleared adder 35. On time step 061, the number XCEP is read from register A1 into the adder along with a control signal $sx$ (generated by the operation control 36 and its associated PGA's) which calls for the adder to depart from its ordinary addition function and to perform instead a subtraction function. On time step 062, the result of the subtraction XEP − XCEP is written from the output trunk AOT into register B5 as the number Ib if the DP signal is then a logic 1 indicating that data processing is in progress. The CAR symbol for time step 062 in Table I signifies that a PGA supplies a "clearing" signal to the adder 35 so that the accumulator is cleared or set to zero. On time step 063, the number $wz$EP is read from register B2 into the cleared adder; and on time step 064 the number $wz$CEP is read into the adder along with a subtraction control signal $sx$. The difference $wz$EP − $wz$CEP which equals the number Kb appears in the accumulator on step 065 and is written into the register B6 as the number Kb if the logic signal DP then has a logic 1 level. Thus, from programmed part coordinate end points, the axis components Ib and Kb corresponding to the path segment to be traveled are computed.

At time steps 066 through 092 in Table I, the adder 35 is programmed to compute the path segment length D. The details of this computational sequence are not given in Table I because they are known to those skilled in the art. It will suffice to say that the numbers Ib and Kb are individually read from their buffer registers and squared, the two squared values are summed, and the square root of that sum is computed. The result is $$D = \sqrt{Ib^2 + Kb^2} \qquad (8)$$

which appears in the accumulator on step 092. At that program step, the numerical value of the path segment D is written into the buffer B7 if the DP logic signal is then at a 1 level.

Further, in Column x600 of Table I the data processing operations are continued to compute the value of TFB which is to be stored in the register B8 on time step x691. Thereafter, the "data ready" signal DR is enabled at time step x697 and the DP signal is cleared at step x699—all as fully described in Case II. As a result of these data processing sequences which follow immediately after a new tape block has been read, the buffer registers B5–B8 receive computed new data representing new values of Ib, Kb, D and TFB.

D. Control of the W and Z Movements

In carrying out the present invention, certain algebraic relations are followed to change numbers so that the system properly responds to W commands, or indeed both W and Z commands, which are expressed in part coordinates by the programming technician and applied as part coordinate numbers (W or Z words) on the input record (punched tape). Each of a series of equations will now be discussed to explain its significance, and the manner win which the equations are physically carried out will be described with reference to the appended tables and FIGS. 3A and 3B.

1. The Basic Equations a. Data Processing

As noted above, the number wzEP in buffer B2 is the end point coordinate value represented by either a W or a Z word contained in the command data block last read by the reader 30. The data processing functions which follow each reading of a tape block, and as explained immediately above, involve the computation:

$$wzEP - wzCEP = Kb \qquad (7)$$

This computation is carried out at program steps x063 through x065 in Table I, and the PGA's associated with the registers B2, A2 and B6 are wire (as the reader will now fully understand from the foregoing cross references) to carry out that computation. In effect, therefore, the distance Kb computed during the data processing sequences represents the distance to be moved (by either the saddle or the spindle when a W word or a Z word has been received) to change the part coordinate position of the tool tip TT from its previous value (i.e., the block n value of wzCEP) to its newly signaled value (i.e., the numerical value of a W or a Z word and which becomes the block n + 1 value wzEP).

b. Transfer Operations

When the active block n is fully executed, the block (n +1) data are transferred to the active registers as hereinabove described with reference to Tables III and IV. As a review, the transferring operation results in:

i. The end point coordinate wzEP being placed as a new value in the active end point coordinate register A2 as the new number wzCEP, where it is ready for use in computing (according to Equation 7) the next-following compoent distance Kb when the next successive tape block is read; and ii. The number Kb is transferred into the register A4 where it becomes the new active number K.

Besides these direct numerical transfers, however, means are provided to signal whether the wz axis command data just transferred into the active registers calls for a W movement or a Z movement. As shown in FIG. 3A, and as noted above, the logic signal NDW or NDZ will reside at a logic "1" level if the last-read block contains a W word or a Z word, respectively. Then, during the transfer operation which is designated in Table IV (and specifically at either time step 3334 or 3824) the ZACT flip-flop 49 will be enabled if the signal NDZ is a logic "1"; or it will be cleared if the signal NDW is a logic "1". Thus, the flip-flop output signal ZACT will be at a logic 1 level when the block ($n + 1$) data reaches the active registers providing that block contained a Z word. Conversely, the signal $\overline{ZACT}$ will be at a logic "1" level if the block ($n + 1$) contained a W word. The designation "ZACT" may thus be viewed as standing for "Z active" since it indicates whether data, stored in the active register and being executed, are to produce movement by operation of the Z servo system rather than by operation of the W servo system.

c. Execution of wz Axis Positioning

After a block of data containing a W or Z word has been transferred into the active registers and is being executed, either the W servo or the Z servo will be operational to move the saddle 25 or the spindle 14 depending upon whether the signal $\overline{ZACT}$ or the signal ZACT is a logic "1". The other servo will hold its corresponding machine element stationary. But the formulation and changing of the servo input numbers WSC and ZSC differs from that described in Cases I and II for the X and Y servo input numbers XSC and YSC.

The changes to be effected during each cycle period $\Delta T$ are:
If either ZACT = 1 or $\overline{ZACT}$ = 1

$$wzCP_{old} + \Delta wz = wzCP_{new} \qquad (9)$$

If ZACT = 1

$$ZTM_{old} + \Delta wz = ZTM_{new} \qquad (10)$$
$$ZTM_{new} + ZOFF = ZMP_{new} \qquad (11)$$
$$\text{Set } ZSC_{new} = ZMP_{new} \qquad (12)$$

If $\overline{ZACT}$ = 1

$$wzCP_{new} + WOFF + TOFF - STM_{new} = WMP_{new} \qquad (13)$$
$$\text{Set } WSC_{new} = WMP_{new} \qquad (14)$$

The quantity $\Delta wz$ in the foregoing equations represents the "macromove distance" to be traveled along the common wz axis by motion of either the spindle 14 or the saddle 25 during each period $\Delta T$ (which, it will be recalled, has been assumed by way of example as being one-fiftieth of a second). The $\Delta wz$ number is stored in the active register A9 after being computed from the wz active component distance number K in exactly the same way as the macromoves $\Delta X$ and $\Delta Y$ are computed from the axis component numbers I and J, as fully described in Cases I and II. The operations reflected by Equations (9) through (14) above are continued for a succession of $\Delta T$ periods until the operation servo (W or Z) has translated its movable element through the component distance K.

Cases I and II describe "Micromove updating" of the servo system input numbers, and that procedure is desirably followed in the present case to progressively change the input numbers WSC and ZSC for the W and Z servo systems. In this way, and as a specific example, the saddle or the spindle is moved through one-tenth of the distance $\Delta wz$ during each tenth of a period $\Delta T$, so that the servo can track smoothly and accurately. It may thus be further noted that during each time column (that is, during each tenth of a period $\Delta T$) shown in Table I, the micromove updatings occur according to the equations:

If ZACT = 1
$$ZSC_{old} + \Delta wx/10 = ZSC_{new} \qquad (15)$$
If $\overline{ZACT} = 1$
$$WSC_{old} + \Delta wz/10 = WSC_{new} \qquad (16)$$

These functions indicated by Equation (15) and (16) take place in each of Columns x000 through x800, and a final or "tenth updating" takes place in the time column x900 (Table I) to assure that full updating change equal to $\alpha wz$ is accomplished during each period $\Delta T$.

d. Details of the wz Axis Movement Execution

It will be realized that when execution of a previous block of active data has been completed, and just before a new data block is transferred into the active registers, the numbers XCP and wzCP will have been incrementally changed until they equal the then-signaled end point part coordinates represented respectively by the stored active numbers XCEP and wzCEP. As the newly transferred active block begins to be executed, the initial values for the numbers XCP and wzCP represent the part coordinate positions which have at that instant been reached along the X and wz axes.

Time steps xx16 through xx30 in every time column (excepting Columns x400 and x900) shown in Table I are used to perform the micromove updating of the X axis servo input number XCS and also such updating of either the WSC or ZSC servo input number. By way of review, the micromove updating for the X axis will first be considered. The organization of the PGA's and the sequential functions are designated at steps x016 through x021 in the x000 column of Table I. As there shown, the number $\Delta X$ is read into the cleared adder on step x016; it is shifted right (in response to the control SR1 supplied by a PGA to the adder) one decimel place on step x017, thereby producing a number equal to $\Delta X/10$ in the adder's accumulator; and the servo input number XSC is read from the register A16 additively into the adder on step x018. The sum $XSC_{old} + \Delta X/10$ appears in the accumulator on step x019 and remains there until step x021 when it is written as a new number $XSC_{new}$ back into the register A16. As indicated by the horizontal arrows drawn in Table I, this same operation occurs nine times, i.e., during each of the other columns (excepting column x400) of each $\Delta T$ period. In the x400 column, however, at steps x403 through x421, a tenth updating occurs. As shown for these time steps:

i. The values $\Delta X$ and XCP are added, and the result written in register A6 as a new value of XCP.

ii. The new value of XCP is added to any X axis offset number XOFF (stored in an offset register not shown in FIGS. 3A and 3B) and the result is written as a new value for XMP in the register A11. The number XMP is thus changed by the amount $\Delta X$ once during each period $\Delta T$.

iii. The new value of XMP is read into the cleared adder on step x416 and then its last four digits are written into the XSC register A16 during time step x421. Because the XSC number has already been changed by 0.9 $\Delta X$, this tenth updating increments the number XSC by an amount equal to 0.1 $\Delta X$, but the numbers XCP and XMP are thus both incremented by the full amount $\Delta X$ one time during each period $\Delta T$.

Such micromove and macromove incrementing of the numbers XCP, XMP and XSC involve exactly the procedure described in Cases I and II with respect to control of the X and Y axis motions there treated.

In the present case, however, the macromove and micromove updates for the W and Z servos are modified to conform to the foregoing Equations (15) and (16). Referring to Column x000 in Table I, at time step x021 the macromove number $\Delta wz$ is read into the cleared adder, and on time step x022 it is shifted one place to the right so that the accumulator holds the value $\Delta wz/10$. On step x023 or step x024, the servo input number WSC or ZSC is read into the adder from register A17 or register A18, but only if the signal $\overline{ZACT}$ or the signal ZACT is respectively a "1". That is, the WSC or the ZSC number is utilized depending upon whether the block of data originally read from the punched tape and now in the active registers originally contained a W word or a Z word. The sum which appears in the adder accumulator on step x025 is thus either i. $WSC_{old} + \Delta wz/10$ if $\overline{ZACT} = 1$, or $\qquad (17)$
ii. $ZSC_{old} + (\Delta wz/10)$ if ZACT = 1. $\qquad (18)$ That sum is then "written back" into the register A17 or the register A18 respectively on time step x026 or time step x030, but only if $\overline{ZACT} = 1$ or ZACT = 1, respectively. Thus, a micromove updating of the number WSC or the number ZSC occurs only if the W servo or the Z servo is to be active in carrying out the commanded positioning along the wz axis.

The same selective wz axis micromove updating occurs also during the same time steps in each of Columns x100 through x800, as indicated by the horizontal arrows drawn in Table I. Thus, Equations (15) and (16) are physically implemented, and motion of the saddle or spindle takes place as the number WSC or the number ZSC progressively changes, depending upon whether the data block being actively executed originally contained a new W word or a new Z word.

The tenth update for the wz axis occurs in Column x900 of Table I and the operations there designated physically carry out Equations (9) through (14). Refering first to time steps x903 through x906, the adder is cleared and the macromove number $\Delta wz$ is read into the accumulator on time steps x903 and x904. The number wzCP is read additively into the adder on step x905 so that the sum $wzCP_{old} + \Delta wz$ appears in the accumulator during step x906. During this latter step, that sum is written back into the register A7 as the updated value $wzCP_{new}$. Therefore, the operation represented by Equation (9) is effected during each period $\Delta T$ and regardless of whether the move commanded in part coordinates along the wz axis is to be accomplished by saddle motion (with $\overline{ZACT} = 1$) or by spindle motion (with ZACT = 1). Of course, when this operation continues for a sufficient number of $\Delta T$'s to change the starting value of wzCP until it equals the end point coordinate value wzCEP, then the active block is fully executed and the number wzCP has been changed by an amount equal to the component K.

On step x900 in Table I, the adder is cleared and the macromove number $\Delta wz$ is read. On step x901, the number ZTM is additively read from the register A15, so that during step x902 an updated value $ZTM_{new}$ appears in the accumulator. On that time step, the new value of ZTM is written back into the register A15 but only if the ZACT signal is then a logic 1. In this way, Equation (10) is carried out during each period $\Delta T$, but only if the spindle servo is to be operational, because only under these circumstances will the signal ZACT = 1 to enable the writing to occur on step x902.

On time step x927 the adder is cleared, and the value of ZTM (previously established during time step x902) is read into the accumulator. On time step x928, the number ZOFF is read additively from the register A21, so that the sum ZTM + ZOFF appears in the accumulator. During time step x929, that sum is written as a new value of ZMP into the register A13, but only if the spindle servo system is active and ZACT = 1. Thus, Equation (11) is accomplished during time steps x927 through x929, but only is ZACT = 1.

The new value of ZMP remains in the accumulator on time step x930, and the last four digits thereof are written as a new value for the number ZSC into the register A18, but again only if ZACT = 1. This accomplishes the operation represented by Equation (12).

On the other hand, if the W servo for the saddle 25 is to be operational, and $\overline{ZACT}$ = 1, the operations represented by Equations (13) and (14) are carried out in lieu of the operations represented by Equations (10), (11) and (12). Observe that on time step x906 the accumulator will always hold the just-previously updated value $wzCP_{new}$. On time step x907 the offset number WOFF is read additively from the register A19 so that the sum $wzCP_{new}$ + WOFF appears in the accumulator. On time step x908 the offset TOFF is read from register A20 and added to that previous sum; and on time step x909, the number ZTM is read, along with a substraction control signal sx, into the adder so that the new accumulator number becomes equal to $wzCP_{new}$ + WOFF + TOFF − $ZTM_{new}$. This result is then written as a new value for the number WMP in the register A12 on time step x915, but only if $\overline{ZACT}$ = 1. In other words, the whole sequence of oeprations for steps x907 through x915 is ineffective unless $\overline{ZACT}$ = 1 because the adder is cleared on the following time step x916. In this way, the function represented by Equation (13) is physically carried out, but only if $\overline{ZACT}$ = 1.

On time step x921, the then existing value of the number WMP is read into the cleared adder where it remains until time step x926. On the latter time step, the last four digits of this number are written as a new value of WSC into the register A17, but only if $\overline{ZACT}$ = 1. Thus, Equation (14) is implemented on time steps x921 and x926.

e. Examples Of wz Axis Positioning Operations

To enable a better appreciation of the overall operation and advantages which the present method and apparatus yield, two specific examples of positioning operations along the wz axis will be described with reference to FIGS. 4 and 5. It is to be noted that the number ZOFF in Equation (11) has not yet been mentioned, and that number will initially be assumed to have a value of zero. But its significance, when finite, will be explained during the following description of FIGS. 4 and 5.

Let it be assumed that the spindle 14 and the saddle 25 reside initially in the relative positions shown by solid lines in FIG. 4. From what has been said earlier and from the dimensions shown, it will be apparent that initially the changeable numbers have the following values:

wzCP = 12 (Part coordinate position of the tool tip, measured from workpiece origin O along the initial part coordinate scale CS1)

ZTM = 2 (Base coordinate position of spindle reference point RP2, measured from the origin 0' along the base coordinate scale CS2)

ZMP = −2 (Same as ZTM, assuming that ZOFF is zero)

ZSC = last four digits of ZMP

WOFF = −6 (Distance along converse base coordinate scale CS3 between origin 0 and the reference point RP1)

TOFF = +3 (Distance along converse base coordinate scale CS3 between reference point RP2 and tool tip TT)

WMP = wzCP + WOFF + TOFF − ZTM = +12 +(−6)+3−(−2)=+11 (Base coordinate position of saddle reference point RP1 measured from the origin 0' along the converse base coordinate scale CS3)

wzCEP = 12 (Part coordinate end point for wz axis, as contained in the last-executed block and held in register A1).

Let it be assumed now that a new block of command information has been read from the tape into buffer storage, and that the data includes a wz command which specifically is W+22. This designates that the saddle 25 is to be moved until the part coordinate of the tool tip, relative to the origin 0, is changed to a value of +22. The number thus stored in buffer B2 as wzEP becomes +22, the signal NDW from the decoder 32 becomes a 1, and the data processing operation described above with reference to steps x063 and x065 results in the number Kb in register B6 being set to Kb = wzEP − wzCEP = +22 − 12 = +10

When these data in buffer storage are transferred to the active registers, then

K in register A4 becomes +10 wzCEP in register A2 becomes +22 and the macromove number $\Delta wz$ in register A9 becomes some small value equal to $(V \cdot \Delta T/D)$ (+10). Moreover, the signal $\overline{ZACT}$ is set to "1" (See Table III).

Immediately after that transfer, and during each successive period $\Delta T$, the number WSC is updated by micromove amounts +($\Delta wz$/10), as explained above with reference to time steps xx21 through xx30 in each of columns x000 through x800 of Table I. In consequence, the number WSC supplied as an input to the servo system changes in a positive sense, and the saddle begins moving toward the left (i.e., in a positive direction along scale CS3). When each tenth update occurs (Col. x900 in Table I) during each $\Delta T$, the number wzCP is increased by the amount + $\Delta wz$, the number WMP is increased by the amount +$\Delta wz$, and the number WSC is driven to equal WMP (i.e., is also increased by +($\Delta wz$/10)}).

This action continues until the active block of data is fully executed, at which time the number wzCP, WMP and WSC will all have increased by the amount K, i.e., by +10, and the saddle will have moved from its initial position (solid lines in FIG. 4) to a new position (dashed lines in FIG. 4); and the several numbers will have changed to new final values. That is:

$wzCP_{final} = wzCP_{initial} + K = 12 + 10 = 22$

As shown in FIG. 4, the origin 0 is moved to a final position 10 units to the left of its initial position, so that the part coordinate scale CS1 now occupies a new position and is represented by the scale CS1' in FIG. 4. The tool tip resides at the part coordinate position +22 on the displaced scale SC1', as required by the original W word command W+22.

Moreover, in reaching the final position of the saddle 25, the number WMP changes to a new value, viz.

$WMP_{final} = (wzCP_{original} + K) + WOFF + TOFF - ZTM$ $WMP_{final} = (12 + 10) - 6 + 3 - (-2) = +21$ That is, the reference point RP1 is now located at +21 on the converse base coordinate scale CS3, and the number WMP reflects that fact. The number WSC has increased by +10 and so caused the W servo system to drive the saddle ten units to the right from its initial position. It is to be observed that the numbers ZTM and ZMP and ZSC have not changed, and the spindle remains at its origianl position, −2 on the base coordinate scale CS2. And most importantly, the number $wzCP$ in its final value of +22 accurately represents the position of the tool tip in part coordinates along the common $wz$ axis.

The operations are different, but produce the same positioning in part coordinates, if a $wz$ positioning operation is to be effected in response to a Z command word contained in a block of data read from the program tape. Referring to FIG. 5, and as shown by solid lines, it is assumed that the saddle and spindle initially reside in the same initial positions shown in FIG. 4. That is, the initial numerical values are:

$wzCP = +12$ on scale CS1
$ZTM = -2$ on scale CS2
$ZMP = -2$ on scale CS2
$ZSC = $ last four digits of ZMP
$WOFF = -6$
$TOFF = +3$
$WMP = wzCP + WOFF + TOFF - ZTM = 12 - 6 + 3 - (-2)$
$WMP = -11$ on scale CS3
$wzCEP = +12$ on scale CS1

Now, let it be assumed that a data block which contained a Z command word Z+5 has been read into buffer storage and data processed. As a consequence:

$wzEP = +5$ in register B2
$K_b = wzEP - wzCEP = 5\ 12 = -7$

When these data in buffer storage are transferred to the active registers then $K$ in register A4 becomes $-7$
$wzCEP$ in register A2 becomes $+$ and the macromove number $\Delta wz$ in register A9 becomes some small value equal to $(V \cdot \Delta T/D)(-7)$, i.e., a negative number. Moreover, the signal ZACT from flip-flop 49 is set to 1, as indicated in Table III.

Immediately after that transfer, the number ZSC is updated by micromove amounts $-(\Delta wz/10)$, as explained with refernce to time steps xx21 through xx30 for columns x000 through 800 in Table I. The number ZSC begins to change in a negative sense, and the spindle 14 is thus driven toward the left (i.e., in a negative direction along the scale CS1). When each tenth update occurs (Col. x900 in Table I) during each $\Delta T$, the numbers $wzCP$ and ZTM are both decreased (increased in a negative sense) by the negative $\Delta wz$ quantity during each period $\Delta T$ (according to Equations (9) and (10) set forth above). Thus, the number ZMP is also correspondingly decreased (increaded negatively) according to Equation (11); and the number ZSC is increased negatively by $(\Delta wz/10)$ when it is driven to agree with ZMP, according to Equation (12).

This action continues until the active block of data is fully executed, at which time the numbers $wzCP$, ZTM, ZMP and ZSC have all been changed by a total amount equal to $K$ (i.e., by $-7$). The spindle will therefore have been moved from its initial position (solid lines, FIG. 5) to its new position (dashed lines, FIG. 5). The several numbers will have been changed to new final values, viz.

$wzCP_{final} = wzCP_{initial} + K = +12 + (-7) = +5$

As shown in FIG. 5, the spindle will have moved to locate the tool tip TT at part coordinate +5 relative to the origin 0 and as measured on the scale CS1. Thus the final part coordinate physically agrees with the assumed command Z+5, and the number $wzCP$ ends up equal to $wzCEP$ which is valid in part coordinates.

Moreover, in reaching the final position of the spindle as shown in FIG. 5, the number ZTM changes to a new value, i.e., $ZTM_{final} = ZTM_{initial} + K = -2 + (-7) = -9$ and the number ZMP reaches a new final value $ZMP_{final} = ZTM_{final} + ZOFF = -9 + 0 = -9$ That is, because ZMP has been changed from its initial value of $-2$ to its final value of $-9$, the reference point RP2 moves from the coordinate $-2$ to the coordinate $-9$ on the base coordinate scale CS2, as shown in FIG. 5. Because ZMP has changed by $-7$, the servo input number ZSC also changes by $-7$ in small steps and the spindle servo motor ZM drives the spindel to the final position shown in FIG. 5.

While the spindle was moving from its initial to its final position, the saddle remained stationary, as plainly shown in FIG. 5, because Equations 13, 14 and 15 simply cannot be performed when the signal ZACT = 1 and the signal $\overline{ZACT} = 0$, as previously explained. But if Equation $(e)$ were carried out just prior to the start of the spindle move illustrated in FIG. 5, the initial values would make $WMP_{initial}$ have the value:

$WMP_{initial} = wzCP + WOFF + TOFF - ZTM = 12 + (-6) + 3 - (-2) = +11$

Since under final conditions in FIG. 5 $wzCP$ has changed by $-7$ and ZTM has changed by $-7$, when Equation 13 is next physically carried out, it will yield:

$WMP_{final} = 5 + (-6) + 3 - (-9) = +11$

In other words, WMP does not change, and the saddle 25 does not move, when the spindle is the member which executes a $wz$ axis positioning operation, but the number $wzCP$ does change to remain valid in part coordinates. This comes about because $wzCP$ and ZTM are both incremented when the spindle moves, but by including ZTM as a negative term (Table I, Col. x900, step x909) in Equation (13) for WMP, the values of WMP and of WSC do not change. Indeed, for this reason, the gating control $\overline{ZACT}$ shown at time step x915 in Table I may be omitted, and the Equation (13) physically carried out during every $\Delta T$ because both $wzCP$ and ZTM are incremented by $\Delta wz$ during each period $\Delta T$ if ZACT = 1 and they act in opposite senses upon WMP so the latter will not change.

It may be desirable as a matter of convenience in some installations to have the origin for the spindle base coordinates offset from the origin for the saddle base coordinates. As treated thus far, FIGS. 4 and 5 deal with the situation where the scale CS2 applies to the number ZMP and along which the position of the reference point RP2 is measured; and the scale CS3 applies to the number WMP. The two scales CS2 and CS3 both have the same origin 0', and the latter scale is simply the converse (opposite sigh) of the former. If, in contrast, one physically sets up the Z servo system with a different origin 0'' (FIGS. 4 and 5), then the offset distance between 0' and 0'' can be dialed into the register A21, and the finite numerical value of ZOFF will be taken into account according to Equation (11) and as designated at time step x928 in Table I. This will not affect the operation as described above, except that the number ZMP will be "offset" from the number ZTM, the ZMP value having significance with respect to the auxiliary base coordinate scale ACS2 in FIGS. 4 and 5, and the number ZTM being measured along the principle base coordinate scale CS2, the latter being viewable as the converse of the base scale CS3. If this is done in the example of FIG. 5, then the initial values are:

$wzCP = +12$ on scale CS1
$ZTM = -2$ on scale CS2
$ZOFF = -4$
$ZMP = ZTM + ZOFF = -2 - 4 = -6$ on scale ACS2
$WOFF = -6$
$TOFF = +3$
$WMP = +11$ on scale CS3
$wzCEP = +12$ on scale CS1

After the spindle reaches the final position of FIG. 5, the final numerical values are:

$wzCP = +5$ on scale CS1
$ZTM = -9$ on scale CS2
$ZOFF = -4$
$ZMP = -9 - 4 = -13$ on scale ACS2
$WOFF = -6$
$TOFF = +3$
$WMP + -11$ on scale CS3

It will be seen now that the improvement of the present invention makes it possible for a programming technician always to write commands for an axis, along which two members are independently movable, in part coordinates reference to an origin which moves with one of the members. He need not keep track of the machine coordinate positions of the two members as they are randomly and alternatively moved. And in the method and apparatus of the invention, part coordinate numbers are maintained valid by causing a command for a first member (spindle) not only to move that member but to increase two numerical terms (e.g., $wzCP$ and ZTM) which contribute in opposite senses to the creation of a machine coordinate number (e.g., WMP) for the second member (saddle), the changes in which result in changing servo-input signals for the second member's servo system.

E. Normalizing Spindle and Saddle Positions

It may happen that with random and alternative W and Z moves programmed in part coordinates, the programmer may unknowingly call for the saddle to end up near the limit of its travel away from the headstock, and call for the spindle quill to be extended out of the headstock nearly to its maximum. Although it is unnecessary for the programmer to keep track of the machine coordinate positions, another feature of the invention makes it possible for him to put in "readjustment" or "normalizing" command blocks at various places in a lengthy program, thereby to be certain that the spindle is restored to some small extension, i.e., to some specified machine coordinate location, before the subsequent program blocks are read and executed. To accomplish this, means are provided in the director of FIGS. 3A and 3B to respond to a special program code (here arbitrarily designated M12) in such fashion that a Z word is treated as a command in machine coordinates. That Z word results in the spindle being moved to the corresponding position in machine coordinates while preserving all numbers which are valid in part coordinates. And for this purpose, an artificial Z command in part coordinates is derived from the Z word in machine coordinates contained in any program block which also contains an M12 code.

More particularly, when a block containing a Z word expressed in machine coordinates (along the scale CS2 in FIG. 4) and an M12 code is read from the punched tape, the M word buffer B4 (FIG. 3B) receives the number 12 from the routing circuits 32 and the decoder 34 produces a 1 level signal on the M12 output line which is included in the several output lines M100 ... M99. The Z word (in machine or base coordinates) is treated in the regular fashion by the routing circuits, and thus is stored in buffer B2 as a new value for $wzEP$. Of course, the NDZ and NDW signals become logic 1 and 0 values, as before.

The system acts, however, to respond differently in its data processing sequences when the M12 signal exits at the output of decoder 34. In particular it causes the following arithmetic operation to take place before any other of the data processing steps:

If M12 = 1

$$wzEP + wzCEP - ZTM = wzEP_{new} \qquad (17)$$

This simply says that the absolute Z coordinate value $wzEP$ (read from a block containing the M12 code) is added to the $wzCEP$ number (representing the part coordinate position to be reached after execution of the previous data block); and the ZTM number (the machine coordinate position of the spindle) is subtracted — with the resultant number being newly stored in register B2 as a new value of $wzEP$.

Referring to Table I, Column x000 at steps x056 to x059, it will be seen that the PGA associated with the READ gate RG for the register B2 is wired to cause reading of the number $wzEP$ into the cleared adder on step x056. On step x057 the number $wzCEP$ is read in additively from register A1, and on step x058 the number ZTM is read in subtractively (with an $sx$ control signal) from the register A15. Thus, the adder on step x059 contains the arithmetic result:

$wzEP + wzCEP - ZTM$

This result is written from the AOT back into the buffer B2 (but only if M12 = 1 and DP = 1) where it becomes a new value for $wzEP$, and one which is an artificial part coordinate command which will cause movement of the spindle to the base coordinate position represented by the original Z word. To permit this entry of the new $wzEP$ number from the adder output trunk AOT into the buffer register B2, a write gate 55 is interposed between the AOT and parallel entry inputs of the register B2. The write gate 55 is controlled by a PGA 56 which is herein shown for completeness as receiving inputs from timing lines 0xx, x5x, xx9 and control signals M12 and DP. Thus on time step x059 the adder accumulator number is writen through the gate 55 into buffer B2 if the M12 code signal exists and if data processing is in progress as indicated by the enabling of the DP signal on previous time step x055.

The data processing sequences proceed thereafter as described above, but on step x063 (Table I) when the number wzEP is read into the adder, that number is the artificial value previously computed, and the artificial value is used at steps x063 to x065 to compute $Kb = wzEP - wzCEP$. Thereafter the block data is transferred to active storage and executed as hereinabove described.

A concrete numerical example will make the foregoing more readily understandable. Suppose that initially:

the saddle is located at WMP = +40 on the CS3 scale of FIG. 4;

the spindle is located at ZTM = −35 on the CS2 scale of FIG. 4;

the tool tip is 8 units to the right of the origin 0, i.e., it is located at $wzCEP = wzCP = +8$ on the CS1 scale; and that the block just read by the reader 30 contains both an M12 code and a Z word of Z−5.

Therefore, initially
WMP = +40
ZTM = −35
wzCEP = +8
wzEP = −5

When the computations of steps x056 through x059 are performed the new value for wzEP becomes $wzEP_{new} = wzEP_{old} + wzCEP - ZTM = -5 + 8 - (-35)$
$= +38$ Then when the new value for $Kb$ is computed at steps x063 through x065, it becomes $Kb = wzEP - wzCEP = +38 - 8 = 30$ As this block of data is transferred to the active registers, the ZACT flip-flop will be set to make signal ZACT = 1, and execution will then proceed with $K = +30$ and the initial values $wzCP = +8$, ZTM = −35, ZMP = −35 (assuming that ZOFF is zero, so the auxiliary scale ACS2 is not used), and WMP = +43. When execution has been completed.

i. ZTM will have been changed from −35 to −5;

ii. ZMP will have been changed from −35 to −5 and ZCS will have changed by +30, so that the spindle will have moved 30 units toward the right as viewed in FIG. 4;

iii. wzCP will have been changed from +8 to +38, and the tool tip will reside 38 units to the right of the part origin 0, and iv. WMP will not have been changed; its computational formula will, however, have had value changes therein, from
Initially: WMP = $wzCP$ + WOFF + TOFF − ATM
$= 8 + (-6) + 3 - (-35) = +40$
Finally: WMP = $wzCP$ + WOFF + TOFF − ZTM
$= 38 + (-6) + (3) - (-5) = +40$ After the spindle has been retracted to a known machine coordinate position (in this example, −5), the part coordinate number wzCP has thus been increased and remains valid. In order to make the saddle and the workpiece move closer to the cutter tip, the programmer can insert a regular W move in part coordinates; for example, he can insert a block with a W+10 command and the saddle will move to the right until the tool tip is located 10 units to the right of the workpiece origin 0.

It will, of course, be understood by those skilled in the art that any program block calling for a W or Z move may also contain an X command, and the X movement will be carried out simultaneously with the spindle or saddle motion, so that contouring rather than simply point-to-point positioning is accomplished. Moreover, all of the operations and advantages here explained are obtained whether the contouring control system is operated in a linear or circular interpolation mode.

TABLE I.—STEPS COMMON TO ALL MODES

| | X000 | X100 | X200 | X300 | X400 | X500 | X600 | X700 | X800 | X900 |
|---|---|---|---|---|---|---|---|---|---|---|
| 00 | Adv. S6 ? S5 Adv. S7 ? S6 | | | Adv. S4 ? S3 | | | | | Adv. S3 ? S2·CYST Adv. S4 ? S3·CYST | CAR, R/Δwz |
| 01 | | | ECYST ? S3·READ CREAD ? S3 | | | | | | | R/ZTM |
| 02 | | | | | | | | | | W/ZTM ? ZACT |
| 03 | | | | | CAR | | | | | CAR |
| 04 | | | | | R/ΔX | | | | | R/Δwz |
| 05 | | | | | R/XCP | | | | | R/wzCP |
| 06 | | | | | W/XCP | | | | | W/wzCP |
| 07 | | | | | R/XOFF | | | | | R/WOFF |
| 08 | | | | | | | | | | R/TOFF |
| 09 | | | | | NONE | | | | | sx, R/ZTM |
| 010 to 014 | | | | | W/XMP | | | | | W/WMP ? ZACT |
| 015 | CAR | | | | | | | | | CAR |
| 016 | R/ΔX | | | | R/XMP | R/ΔX | | | | |
| 017 | SR1 | | | | | SR1 | | | | |
| 018 | R/X8C | | | | | R/X8C | | | | |
| 019 | | | | | | | | | | |
| 020 | | | | | | | | | | |
| 021 | W/X8C, CAR | | | | | | | | | W/X8C, CAR |
| 022 | R/Δwz | | | | | | | | | R/WMP |
| 023 | SR1 | | | | | | | | | |
| 024 | R/WSC ? ZACT | | | | | | | | | |
| 025 | R/ZSC ? ZACT | | | | | | | | | |
| 026 | W/WSC ? ZACT | | | | | | | | | W/WSC ? ZACT CAR, R/ZTM |
| 027 | | | | | | | | | | R/ZOFF |
| 028 | | | | | | | | | | W/ZMP ? ZACT |
| 029 | | | | | | | | | | W/ZSC ? ZACT, CAR |
| 030 | W/ZSC ? ZACT, CAR | | | | | | | | | |
| 31 to 34 | | | | | | | | | | |
| 35 | | | | | | | | | R/J | |
| | | | | | | | | −3.3333 ch. + m. equals .3333×10⁻³ | | |
| 36 | | | | | R/I | | ed, CIT(−), CIT 32, CIT 31, CIT 42, CIT 41, CIT 52, CIT 51, CIT 62, CIT 61, CIT 72, CIT 71 | | | |
| | | | | | | | ← Carry Out division R/D | | | |
| 37 | | | | | emx, R Q | | | | | emx, R Q |
| 38 to 54 | | | | | Carry Out IXQ multiplication | | | | | Carry Out KXQ multiplication |
| | | | | | cmx | | | | | cmx |
| | | | | | SL4 | | | | | SL4 |
| | | | | | R/XR | | | | | R/wzR |
| | | | | | SR4 | | | | | SR4 |
| | | | | | W/ΔX | | | | | W/Δwz |
| | | | | | ZR1 | | | | | ZR1 |
| | | | | | SL4 | | | | | SL4 |
| | | | | | W/XR,CAR | | | | | W/wzR, CAR |
| 55 | EDP ? DPR | | | | | | | | | |
| 56 | R/wzEP | | | | | | | | | |
| 57 | R/wzCEP | | | | | | | | | |
| 58 | sx, R/ZTM | | | | | | | | | |
| 59 | W/wzEP ? M12·DP, CAR | | | | | | | | | |
| 60 | R/XEP | | | | | | | | | |
| 61 | sx, R/XCEP | | | | | | | | | |
| 62 | W/Ib ? DP, CAR | | | | | | | | | |
| 63 | R/wzEP | | | | | | | | | |
| 64 | sx, R/wzCEP | | | | | | | | | |
| 65 | W/Kb ? DP | | | | | | | | | |

Table I—Continued

| | X000 | X100 | X200 | X300 | X400 | X500 | X600 | X700 | X800 | X900 |
|---|---|---|---|---|---|---|---|---|---|---|
| 66 to 88 | Compute $D=\sqrt{I_b{}^2+K_b{}^2}$ ← → | | | | | | | | | |
| 89 | | | | | | | cd | | | CTAD ? S9 |
| 90 | | | | | | | | | | TRR ? S9 · CYST, |
| 91 | | | | | | | | | | CDR S10 ? S9 |
| 92 | W/D ? DP | | | | | | W/TFB ? DP | | | Adv. S10 ? S9 |
| 93 | | | | | | | | | | Adv. S11 ? S10 |
| 94 | | | | | | | | | | Adv. S12 ? S11 |
| 95 | | | | | | | | | | Adv. S13 ? S12 |
| 96 | | | | Adv. S5 ? S4 | | | EDR ? DP | | Adv. S5 ? S4 | Adv. S14 ? S13 |
| 97 | | | | | | | GDPR ? DP CDTZ ? $\overline{CDP}$ | | | Adv. S15 ? S14 |
| 98 | | | | | | | Adv. S8 ? | | | Adv. S16 ? S15 |
| 99 | | | | | | | S2 · READ · DR | | | Adv. S1 ? S16 |

TABLE II.—STEPS PECULIAR TO MODE 1

| | 1000 | 1100 | 1200 | 1300 | 1800 |
|---|---|---|---|---|---|
| 1 to 25 | | | | | |
| 26 | | | CAR | | |
| 27 | | | | | |
| 28 | | | | | |
| 29 | | | R/SP3 | | |
| 30 | | | R/SP3 | | |
| 31 | | emx'' | W/SP2&R/SP3 ? VDA | | |
| 32 | | R/SP3 | R/SP2 ? VDA | | |
| 33 | | | R/SP2 ? VDA | | |
| 34 | XX, R/K | R/PCF ? $\overline{\text{DTZ}}$, R/1.0 ? DTZ | SE2 | | |
| 35 | E FAX ? AGB, C FAX ? ALB | | R/.0075 ? VDA | | |
| 36 | CAR, R/XCP ? FAX, R/wzCP ? $\overline{\text{FAX}}$ | | R/SP1 | emx'' | |
| 37 | | | W/SP1 | R/PVC ? $\overline{\text{IFA}}$ | |
| 38 | sx, R/XCEP ? FAX R/wzCEP, ? $\overline{\text{FAX}}$ | | CSAV, CAR, R/PVA | | |
| 39 | E ACNX ? COT(−), CACNX ? $\overline{\text{COT}}$(−) | | cx, R/5.0 | R/PCF ? $\overline{\text{TAD}}$ + DTZ R/1.0 ? DTZ·TAD | |
| 40 | R/ΔX ? FAX R/Δwz ? $\overline{\text{FAX}}$ | | E SAV ? TAD·DTZ·$\overline{\text{AGB}}$ | | |
| 41 | XXX ? FAX, SL1 ? $\overline{\text{FAX}}$ | | CAR, R/XCP ? FAX, R/wzCP ? $\overline{\text{FAX}}$ | | |
| 42 | SL1 ? FAX, R/Δwz ? $\overline{\text{FAX}}$ | Multiply | R/ΔX ? FAX, R/Δwz ? $\overline{\text{FAX}}$ | | |
| 43 | R/Δwz ? $\overline{\text{FAX}}$ | | R/ΔX ? LABM·TAD·FAX, R/Δwz ? LABM·$\overline{\text{TAD}}$·FAX | | |
| 44 | R/Δwz ? FAX | | sx, R/XCEP ? FAX, R/wzCEP ? $\overline{\text{FAX}}$ | | |
| 45 | R/Δwz ? FAX | | cx, R/SP1 ? $\overline{\text{TAD}}$, R/.007 ? TAD | | |
| 46 | R/Δwz ? FAX | | C SAV ? $\overline{\text{AGB}}$, FUL, R/SP1 | | |
| 47 | Adv.·S2 ? S1·$\overline{\text{SST}}$·CYST | | FUL, R/ΔX ? LZBM·FAX, R/Δwz ? LABM·$\overline{\text{FAX}}$ | Multiply | |
| 48 | R/Δwz·$\overline{\text{FAX}}$, R/ΔX ? FAX Adv. S3 ? S2·CYST | | W/LAB ? $\overline{\text{TAD}}$,$\overline{\text{CAR}}$, E/TAD ? $\overline{\text{AGB}}$·$\overline{\text{TAD}}$, R/ΔX ? FAX, R/Δwz ? $\overline{\text{FAX}}$ | | |
| 49 | R/ΔX ? FAX, R/Δwz ? $\overline{\text{FAX}}$ | | cx, R/LAB | | |
| 50 | R/ΔX ? FAX, R/Δwz ? $\overline{\text{FAX}}$ | cmx'' | E SAD ? $\overline{\text{AGB}}$, C SAD ? AGB, CAR | | |
| 51 | R/Δwz ? FAX | cx, R/180 | W/LAB ? SAD | | |
| 52 | R/Δwz ? FAX | CAR&R/180 ? AGB | R/PVB | | |
| 53 | Adv. S2 ? S1·$\overline{\text{SST}}$·CYST | W/SP3, sx, R/PVA, CVD | SR1 | | |
| 54 | | W/PVB ? TAD, cx, R/3.0 | W/PVB ? TAD | | |
| 55 | | EVDA ? AGB | | cmx'' | |
| 56 | | FUL&R/3.0 ? VDA | | | |
| 57 | | W/SP2 | | cx, R/180 | |
| 58 | | R/SP2 | | CAR & R/180 ? AGB | |
| 59 | | W/SP1, R/SP2 | | W/PVC, sx, R/PVA, CVD | |
| 60 | | R/SP1 | | EVDM ? COT(−), cx, R/3.0 | |
| 61 | | SR1, R/SP1 | | EVDA ? AGB, cx, R/0.3 | |
| 62 | | | | EVDB ? AGB·$\overline{\text{VDA}}$, cx, R/0.1 | |
| 63 | | SR2 ? $\overline{\text{VDA}}$, SR3 ? VDA | | EVDC ? AGB·$\overline{\text{VDA}}$·$\overline{\text{VDB}}$ | |
| 64 | | | | CAR,R/PVC ? $\overline{\text{VDA}}$·$\overline{\text{VDB}}$·$\overline{\text{VDC}}$, R/PVA ? VDA+VDB+VDC | CAR, R/PVA |
| 65 | | | | sx ? VDM, R/1.0 ? $\overline{\text{VDA}}$·SAD·SAV R/0.1 ? VDB·TAD, R/.01 ? VDC, R/PVB ? VDB·TAD | → |
| 66 | | | | CAR ? COT(−) | → |
| 67 | | | | W/PVA | → |
| 68 | | W/LAB ? $\overline{\text{TAD}}$,CAR,R/SP3 | | CAR | → |
| 69 | | R/SP3 | | | |
| 70 | | W/SP1,R/SP3 | | emx',R/PVA | → |
| 71 | | SR1, R/SP3 | | | |
| 72 | | R/SP1 | | R/TFA ? $\overline{\text{S4}}$ R/TFB ? S4 | → |
| 73 | | SR3 | | | |
| 74 | | R/.001 ? VDA, | | | |
| 75 | | FP, R/ΔX ? FAX, | | | |

Table II — Continued

| | 1000 | 1100 | 1200 | 1300 | 1800 |
|---|---|---|---|---|---|
| 76 | | R/Δwz ? $\overline{FAX}$ W/SP2, cmx" | | | |
| 77 | | R/SP2 | | | Multiply ⟶ |
| 78 | | | | | |
| 79 | | R/LAB | | | |
| 80 to 83 | | | Multiply | | |
| 84 | CAR, R/FB | | | | |
| 85 | ????????R/FA | cmx" ↓ | | cmx' W/Q ? 84 W/SP3 ? 84 | ⟶ |
| 86 | E ANR ? $\overline{ALB \cdot DTZ}$ C ANR ? $\overline{ALB \cdot DTZ}$ | SL1 | | | |
| 87 | CAR, R/FB ? ANR, R/.003 ? DTZ | W/SP1 | | CAR, R/FA ? TAD, R/.003 ? DTZ·TAD, R/FB ? ANR·TAD | |
| 88 | SL2 | | | SL2 | |
| 89 | W/SP3 | | | W/PVC | |

TABLE III. — STEPS PECULIAR TO MODE 2

| | 2300 | 2800 |
|---|---|---|
| 1 to 75 | NONE | ⟶ |
| 76 | AR, R/SP3 ? S7 | ⟶ |
| 77 | W/Q ? S7, CAR | ⟶ |
| 78 | R/GB ? S7 · $\overline{GO9}$ | ⟶ |
| 79 | W/G ? S7, CAR, R/Ib ? S7 · LIN · $\overline{CYSP}$ | ⟶ |
| 80 | W/I ? S7 · LIN, CAR R/Kb ? S7 · LIN · $\overline{CYSP}$ | ⟶ |
| 81 | W/K ? S7 · LIN, CAR | ⟶ |
| 82 | Adv. to 88 ? S7 | ⟶ |
| 83 | | |
| 84 to 89 | NONE | |

TABLE IV. — STEPS PECULIAR TO MODE 3

| | 3300 | 3800 |
|---|---|---|
| 1 to 33 | NONE | |
| 34 | E ZACT ? NDZ;CZACT ? NDW | ⟶ |
| 35 | R/XEP W/XCEP, | ⟶ |
| 36 | CAR, R/wzEP W/wzCEP | ⟶ |
| 37 | CAR R/TFB | ⟶ |
| 38 | W/TFA, CAR, R/FB | ⟶ |
| 39 | W/FA, CAR, | ⟶ |
| 40 to 77 | NONE | |
| 78 | CNDM, EDTZ, CANR, CCYST ? CYSP | ⟶ |
| 79 | Adv. to 89 ? S8 | ⟶ |
| 80 to 89 | NONE | |
| 90 | | |
| 91 to 99 | NONE | |

I claim:

1. The method of controlling the successive positioning of a part relative to a tool member which are both independently movable along a common axis relative to a base, and wherein successive values of a signaled command number (W) call for movements of the part to make the positions of the member, measured in part coordinates from a first origin on the part, agree with such values, said method comprising a. signaling a first number ($wzCP$) whose value represents the desired part coordinate position of said member, b. signaling a second number (ZTM) whose value dynamically changes and always represents the position of said member in base coordinates measured from a second origin on the base, c. in response to signaling of a new value of the command number (W), changing said first number ($wzCP$) by an amount equal to the difference between the new and the previous values of the command number, d. changing said first number by an amount equal to the change in the value of said second number when said member is moved, and e. moving said part along the base to keep its position in base coordinates equal to said first number but offset by an amount equal to the value of said second number.

2. The method of controlling the successive positioning of a part relative to a tool member, where both the part and the member are independently movable along a common axis relative to a base, in response to successive values of a signaled command number (W) which represents the desired position of the member in part coordinates referenced to a first origin on the part, said method comprising a. signaling a first number ($wzCP$) representing the desired relative position of said member in part coordinates, b. signaling a second number (ZTM) which changes to dynamically represent the position of said member in base coordinates referenced to a second origin on the base, c. signaling a third number (WMP) equal to the difference between said first and second numbers and which represents the desired position of said part in converse base coordinates measured relative to said second origin, d. in response to signaling of a new value of said command number (W), changing said first number ($wzCP$) by an amount equal to the difference between the new and previous value of the command number, e. changing said first number ($wzCP$) by an amount equal to the change in said second number which occurs whenever said member is moved, and f. moving said part along the base to keep its position in converse base coordinates in agreement with the value of said third number (WMP).

3. The method of controlling the successive positioning of a first point (TT) on a member relative to a first origin on a part where both the member and the part are independently movable along a common axis relative to a base, said first origin being the origin (0) for a part coordinate scale and displaced by a first offset (WOFF) from a first reference point (RP1) fixed relative to the part, and said first point (TT) being displaced by a second offset (TOFF) from a second reference point (RP2) fixed relative to the member, said method comprising a. signaling a command number (W) whose value represents the desired position of said first point in part coordinates, and from time-to-time changing that value,
  b. signaling a first number ($wz$CP) representing the desired position of said first point in part coordinates,
  c. signaling a second number (ZTM) dynamically representing the position of said second reference point in base coordinates referenced to a second origin (0') fixed on the base,
  d. signaling a third number (WMP) which represents the desired position of said first reference point in converse base coordinates, by adding to said first number the first and second offsets and subtracting said second number,
  e. in response to signaling of a new value of said command number (W), changing said first number by an amount equal to the difference between the new value and the previous value of the command number,
  f. changing the value of said first number by an amount equal to any changes which occur in the value of said second number, and
  g. moving said part and member relative to the base to keep the positions of said first and second reference points, as measured in the respective converse base and base coordinates, in agreement with the respective values of said third and second numbers, whereby changes in said command number (W) always result in said first point being located at the corresponding position in part coordinates by movement of said part, despite the fact that said member may be moved from time-to-time with corresponding changes in said second number.

4. The method of controlling the successive positioning of first and second members (25 and 14) independently movable relative to a base along a common axis by signaling respective first and second command numbers (W or Z) referenced in part coordinates to a first origin at a predetermined location on the first member, said method comprising a. signaling a third number ($wz$CP) which represents the desired relative position of said members in part coordinates,
  b. signaling a fourth number (ZTM) which dynamically represents the position of said second member in base coordinates relative to a second origin fixed on the base,
  c. signaling fifth and sixth numbers (WMP and ZMP) and causing said first and second members to move along the common axis to base coordinate positions which correspond to the respective values of such numbers,
  d. in response to a change in said first command number (W) to a new value,
    1. changing said third number by an amount corresponding to the difference between said new value and the previous value of the last-signaled one of said first and second numbers, and
    2. changing said fifth number by that same amount;
  e. in response to a change in said second command number (Z) to a new value,
    1. changing said third number by an amount corresponding to the difference between said new value and the previous value of the last-signaled one of said first and second numbers,
    2. changing said fourth number by that same amount, and
    3. changing said sixth number by that same amount; and
  f. carrying out said signaling of said fifth number (WMP) by subtracting said fourth number (ZTM) from said third number ($wz$CP), whereby the fifth number does not change as a consequence of a change in said second number but said third number remains an accurate representation of the position of said second member in part coordinates.

5. The method of controlling the positions of two members movable independently relative to a base along a common axis in response to respective signaled command numbers (W or Z) which define the desired relative position of a first point (RP2) on the second member relative to a second point on the first member, said second point being a first origin (0) for a part coordinate scale along which said relative position is measured, said method comprising a. signaling the desired relative position of the first point in part coordinates as a first number ($wz$CP),
  b. signaling the position of said first point, in base coordinates measured from a second origin (0') fixed on the base, as a second number (ZTM),
  c. signaling third and fourth numbers (WMP and ZMP) which represent the respective desired positions of said first origin in base coordinate values and said first point in converse base coordinate values, by setting said third number equal to the difference between said first and second numbers and by setting said fourth number equal to said second number,
  d. in response to signaling of a new value of the command number (W) calling for movement of the first member to relocate said first point in part coordinates,
    1. changing said first number ($wz$CP) by an amount equal to the difference between said new value and the previous value of that command number, and
    2. changing said third number (WMP) by the same amount,
  e. in response to signaling of a new value of the command number (Z) calling for movement of the second member to relocate said first point in part coordinates,
    1. changing said first number by the amount of the difference between said new value and the previous value of that command number, and
    2. changing said second number (ZTM) by the same amount, whereby the two terms which form said third number are changed equally and oppositely so that the third number does not change, f. and moving said first and second members along the common axis always to keep such members positioned on the base coordinate scale respectively in agreement with the value of said third and fourth numbers.

6. The method of controlling the successive positioning of a first point (TT) on a member (14) relative to a first origin on a part (25), where both the member and the part are independently movable along a common axis relative to a base, said first origin being the origin (0) for a part coordinate scale and displaced by a first offset (WOFF) from a first reference point fixed relative to the part, and said first point (TT) being displaced by a second offset (TOFF) from a second reference point (RP2) fixed relative to the member, said method comprising
  a. signaling from time-to-time either a first or a second type of positioning command number (W or Z) which respectively call for movement of the part or movement of the member to locate said first point at a position in part coordinates corresponding to the value of the command number,
  b. signaling a first number (wzCP) which in value designates the desired position of said first point in part coordinates,
  c. signaling a second number (ZTM) which in value represents the desired position of said second reference point (RP2) in base coordinates referred to a second origin (0') fixed on the base,
  d. signaling a third number (WMP) which is formed and changed to be equal to the sum of said first number plus said first and second offsets minus said second number,
  e. signaling a fourth number (ZMP) which is formed and changed to be equal to said second number plus any offset distance between said second origin (0') and a third origin (0'') for auxiliary base coordinates,
  f. in response to signaling of a new value of a command number of either type (Z or W), changing the first number (wzCP) by an amount equal to the difference between the new value and the previous value of such command number,
  g. in response to the signaling of a new value of a command number of the second type (Z), changing the value of the second number (ZTM) by an amount equal to the difference between the new value and the previous value of the command number,
  h. moving said member to keep the position of said second reference point along the auxiliary base coordinates in agreement with the value of said fourth number (ZMP), and
  i. moving said part to keep the position of said first reference point along the converse of said base coordinates in agreement with the value of said third number (WMP).

7. In a system for controlling the successive positioning of a part (25) relative to a member (14), which are both independently movable along a common axis relative to the base of a machine tool, in response to successive values of a signaled command number (W) which designates the commanded positions of the member in part coordinates referenced to a first origin (0) on the part and which are to be reached by movement of the part, the combination comprising
  a. means for signaling a first changeable number representing said command number (W),
  b. means for signaling a second changeable number (wzCP) representing a desired position of said member in part coordinates,
  c. means for signaling a third changeable number (ZTM) and for dynamically changing such number to agree with the position of said member in base coordinates referenced to a second origin (0') fixed relative to the base,
  d. means responsive to a change in said first number to a new value for changing said second number by an amount equal to the difference between the new value and the previous value of the first number,
  e. means for changing said second number by an amount equal to the change in said third number which occurs when said member is moved relative to the base, and
  f. means for moving said part along the base to keep its position in converse base coordinates equal to the difference between said second and third numbers.

8. In a system for controlling the successive positioning of first and second members which are independently movable along a common axis relative to a base and relative to each other, and wherein successive values of a command number (W) are received as input signals to designate commanded relative positions of the two members measured in part coordinates with reference to an origin 0 on or fixed relative to the first member, the combination comprising
  a. means for signaling a first changeable number (wzCP) representing the desired relative position of said numbers in part coordinates,
  b. means for signaling a second changeable number (ZTM) representing the position of said second member in base coordinates referenced to a second origin on or fixed relative to the base,
  c. means for signaling a third (WMP) changeable number formed summation of terms which include said first and second numbers subtractively combined,
  d. means responsive to a newly signaled value of said command number (W) for changing said first number (wzCP) by an amount equal to the difference between the new and the previous value of the command number,
  e. means for changing said first number (wzCP) by an amount equal to the change in said second number whenever said second member is moved, and
  f. means for driving said first member along the base to keep its position in converse base coordinates in agreement with the value of said third number (WMP).

9. In a system for controlling the successive positioning of first and second members which are independently movable along a common axis relative to a base, and wherein successive values of a changeable input number (W) are signaled to designate commanded positions of a first point (TT) on the second member to be reached relative to a first origin on the second member in part coordinates measured from such origin, said first origin being displaced from a first reference point (RP1) on the first member by a first offset (WOFF) and said first point being displaced from a second reference point (RP2) on the second member, the combination comprising
  a. means for signaling and from time-to-time changing a command number (W) whose value represents commanded positions of said first point in part coordinates,
  b. means for signaling a first changeable number (wzCP) representing the desired position of said first point in part coordinates,
  c. means for signaling a second changeable number dynamically representing the position of said second reference point (RP2) in base coordinates referenced to a second origin (0') on or fixed relative to the base,
  d. means for repeatedly adding said first number, said first offset and said second offset and subtracting said second number to produce and signal a third changeable number (WMP) which represents the desired position of said first reference point in converse base coordinates,
  e. means responsive to signaling of a new value of said command number (W) for changing the value of said signaled first number (wzCP) by an amount equal to the difference between the new and the previous value of the command number,
  f. means for changing the value of the signaled first number (wzCP) by an amount equal to any changes which occur in the value of said second number, and
  g. means for moving said first and second members relative to the base to keep the positions of said first and second reference points (RP1 and RP2) dynamically in agreement with said third and second numbers (WMP and ZTM) along the converse of said base coordinates and in said base coordinates, respectively.

10. In a system for controlling the successive positioning of first and second members independently movable along a common axis relative to a base in response to input signals representing first or second command numbers (W or Z) in part coordinates referenced to a first origin (0) at a predetermined location on or fixed relative to the first member, the combination comprising
  a. means for signaling a third number (wzCP) representing the desired relative position of said members in part coordinates,
  b. means for signaling a fourth number (ZTM) dynamically representing the position of said second member in base coordinates relative to a second origin on or fixed relative to the base,
  c. means for signaling fifth and sixth numbers (WMP and ZMP),
  d. means for respectively driving said first and second members along the base to keep the positions thereof measured in base coordinates and in converse base coordinates dynamically in agreement with the signaled first and sixth numbers, respectively,
  e. means responsive to a change in said first command number (W) to a new value for
    1. changing said third number (wzCP) by an amount corresponding to the difference between said new value and the last-signaled value of said first or second numbers, and
    2. changing said fifth number by that same amount,
  f. means responsive to a change in said second number (Z) to a new value for
    1. changing said third number (wzCP) by an amount corresponding to the difference between said new value and the last-signaled value of said first or second numbers,
    2. changing said fourth number (ZTM) by that same amount, and
    3. changing said sixth number (ZMP) by that same amount, and
  g. said means for signaling said fifth number including means to vary the signaled value of the fifth number in accordance with the difference between said third and fourth numbers.

11. In a system for controlling the successive positioning of first and second members independently movable along a common axis relative to the base of a machine tool in response to successive values of either of two signaled command numbers (W or Z) which designate the commanded position of the member in part coordinates referenced to a first origin on the part, the combination comprising
  a. means for signaling a command number of one or the other type (W or Z) and from time-to-time changing its value to represent the commanded position of said member in part coordinates,
  b. means for signaling first changeable number (wzCP) representing a desired position of said member in part coordinates,
  c. means for signaling a second changeable number (ATM) which represents the desired position of said member in base coordinates referenced to a second origin at a predetermined location on the base,
  d. means for signaling a third changeable number (WMP) which is always equal to the difference (wzCP − ZTM) between said first and second numbers plus any applicable offsets,
  e. means for signaling a fourth number (ZMP) which is always equal to said second number plus any applicable offsets,
  f. means responsive to signaling of a new value of said command number in the said one type (W) for changing said fist number by an amount equal to the difference between the new value and the previous value of the command number,
  g. means responsive signaling of a new value of said command number in the said other type (Z) for
    1. changing said first number by an amount equal to the difference between the new value and the previous value of the command number, and
    2. changing said second number by said last-named amount,
  h. means for moving said first member to keep its position in converse base coordinates equal to the numerical value of said third number, and
  i. means for moving said second member to keep its position in base coordinates equal to the numerical value of said fourth number.

* * * * *